United States Patent
Shimada et al.

(10) Patent No.: US 9,671,528 B2
(45) Date of Patent: Jun. 6, 2017

(54) OPTICAL SHEET, SURFACE LIGHT SOURCE DEVICE AND TRANSMISSION TYPE DISPLAY DEVICE

(75) Inventors: Takayuki Shimada, Saitama (JP); Fumihiro Arakawa, Fujimi (JP); Satoshi Goishihara, Kazo (JP); Hiroshi Kojima, Kawagoe (JP); Runa Nakamura, Tokyo-To (JP); Akinobu Ushiyama, Moriya (JP); Satoko Maenishi, Saitama (JP); Kazuki Tanaka, Tokyo-To (JP); Akiko Tomita, Kawagoe (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 1296 days.

(21) Appl. No.: 13/122,844

(22) PCT Filed: Oct. 6, 2009

(86) PCT No.: PCT/JP2009/067407
§ 371 (c)(1),
(2), (4) Date: Aug. 3, 2011

(87) PCT Pub. No.: WO2010/041656
PCT Pub. Date: Apr. 15, 2010

(65) Prior Publication Data
US 2011/0280004 A1    Nov. 17, 2011

(30) Foreign Application Priority Data

Oct. 7, 2008 (JP) .................................. 2008-260829
Apr. 3, 2009 (JP) .................................. 2009-091425

(51) Int. Cl.
*F21V 7/04* (2006.01)
*G02B 5/02* (2006.01)
(Continued)

(52) U.S. Cl.
CPC ............ *G02B 5/0242* (2013.01); *F21V 11/16* (2013.01); *G02B 3/0056* (2013.01);
(Continued)

(58) Field of Classification Search
CPC ..... F21V 11/16; G02B 3/0056; G02B 5/0221; G02B 5/0231; G02B 5/0242;
(Continued)

(56) References Cited

U.S. PATENT DOCUMENTS 5,771,328 A   6/1998 Wortman et al.
5,852,514 A   12/1998 Toshima et al.
(Continued)

FOREIGN PATENT DOCUMENTS

JP   08-304608 A1   11/1996
JP   08-335044 A1   12/1996
(Continued)

OTHER PUBLICATIONS

Chinese Office Action dated Nov. 16, 2012 (with English translation).
Japanese Office Action (with English Translation), Japanese Patent Application No. 2009-232565, dated Jul. 2, 2013 (5 pages).

*Primary Examiner* — Jason Moon Han
(74) *Attorney, Agent, or Firm* — Burr & Brown, PLLC

(57) ABSTRACT

There is provided an optical sheet which can prevent problems when it is superimposed on another member. The optical sheet includes: a sheet-like base layer; a light control layer having unit shaped elements arranged in a direction parallel to a sheet surface of the base layer; and a light diffusing layer disposed between the base layer and the light control layer. The light diffusing layer includes a binder resin portion and particles dispersed in the binder resin portion. The particles in the binder resin portion includes a single particle and an aggregate formed of aggregated single particles.

17 Claims, 16 Drawing Sheets

(51) Int. Cl.
*G02B 3/00* (2006.01)
*F21V 8/00* (2006.01)
*F21V 11/16* (2006.01)
*G02F 1/1335* (2006.01)
*F21Y 103/00* (2016.01)

(52) U.S. Cl.
CPC ......... *G02B 5/0221* (2013.01); *G02B 5/0231* (2013.01); *G02B 5/0278* (2013.01); *G02B 6/0051* (2013.01); *G02B 6/0053* (2013.01); *G02F 1/133606* (2013.01); *F21Y 2103/00* (2013.01); *G02F 2001/133607* (2013.01)

(58) Field of Classification Search
CPC .. G02B 5/0278; G02B 6/0051; G02B 6/0053; G02F 1/133606
USPC ............. 362/97.1–97.4, 606–607, 615–629; 349/62–65
See application file for complete search history.

(56) References Cited

U.S. PATENT DOCUMENTS

| | | | |
|---|---|---|---|
| 5,995,288 A * | 11/1999 | Kashima et al. | 359/599 |
| 7,450,809 B2 | 11/2008 | Choi et al. | |
| 2007/0229804 A1 | 10/2007 | Inoue et al. | |
| 2008/0174875 A1* | 7/2008 | Iwata et al. | 359/599 |

FOREIGN PATENT DOCUMENTS

| | | |
|---|---|---|
| JP | 09-127314 A1 | 5/1997 |
| JP | 11-316304 A1 | 11/1999 |
| JP | 2006-220995 | 8/2006 |
| JP | 2007-034287 A1 | 2/2007 |
| JP | 2007-293303 A1 | 11/2007 |
| JP | 3140193 U | 2/2008 |
| WO | 2008/084744 | 7/2008 |

* cited by examiner

| | EXAMPLE A1 | COMPARATIVE EXAMPLE A1 | EXAMPLE B1 | COMPARATIVE EXAMPLE B1 |
|---|---|---|---|---|
| LUMINANCE DISTRIBUTION | | | | |
| HALF-VALUE ANGLE | 30° | 26° | 30° | 26° |
| CONSTRUCTION | | | | |

OPTICAL SHEET, SURFACE LIGHT SOURCE DEVICE AND TRANSMISSION TYPE DISPLAY DEVICE

BACKGROUND OF THE INVENTION

1. Field of the Invention

The present invention relates to an optical sheet capable of changing the travel direction of light. The present invention also relates to a surface light source device and a transmission type display device, each having such a useful optical sheet.

2. Description of Related Art

A surface light source device, which is used in a transmission type display device such as a liquid crystal display device, has a light source and a number of optical sheets (optical films) for changing the travel direction of light from the light source, as disclosed e.g. in U.S. Pat. No. 5,771,328 and JP 8-304608A.

Among the number of optical sheets, in general, an optical sheet having a function (light diffusing function) to diffuse light from the light source and thereby shade (obscure) the image of the light source, an optical sheet having a function (light condensing function) to change the travel direction of light so that the angle (exit angle) between the direction of the exiting light and the front direction becomes smaller, thereby enhancing the front direction luminance, etc. are included.

As the optical sheets having a light condensing function, the optical sheets, having unit prisms (unit shaped elements, unit optical elements) extending linearly and arranged in a direction perpendicular to the longitudinal direction of the prisms (this arrangement manner is the so-called "linear arrangement"), are widely used. The unit prisms of the optical sheet each typically have a triangular, ellipsoidal or circular cross-sectional shape. Such unit prisms thus have ridge lines extending in the longitudinal direction thereof.

Various problems may arise when an optical sheet having unit prisms comes into contact with another member, such as another optical sheet or the light incident side surface of a transmission type display unit such as a liquid crystal display panel. Specifically, a fringe like pattern may be produced in a region where the unit prisms of an optical sheet are in contact with another member. Examples of the fringe like pattern include an annular pattern like so-called "Newton's rings", a rainbow pattern with rainbow-like color hues, a wetting pattern (also called "wet-out") observed as staining with a liquid, etc. In conventional practice, a light diffusing sheet is interposed between the prism surface of an optical sheet and a liquid crystal panel so as to make such a fringe like pattern (fringe pattern) invisible.

On the other hand, with a view to producing thinner display devices and reducing the production cost, there is a strong demand in these days for reduction of the number of optical sheets incorporated in a surface light source device (display device). In some display devices, therefore, a light diffusing sheet is not provided between an optical sheet having prisms and a liquid display panel, and the unit prisms of the optical sheet are in contact with the smooth light incident side surface of the transmission type display unit. The above-described fringe like pattern is likely to be clearly visible in such a display device compared to the conventional common display device having a light diffusing sheet disposed between a transmission type display unit and an optical sheet having unit prisms.

Thus, in order to meet the demands for thinner display devices and reduced production cost, a strong desire exists to prevent the formation of a fringe like pattern by devising an appropriate construction of an optical sheet having unit shaped elements without using an additional light diffusing sheet.

In order to attain this aim, U.S. Pat. No. 5,771,328 discloses an optical sheet in which part of the unit prisms (unit shaped elements) is made higher than the other prisms. According to the optical sheet of U.S. Pat. No. 5,771,328, only the higher unit prisms make contact with another member. The patent is thus intended to decrease the contact area between the optical sheet and another member and to position most of the unit prisms at a distance from a display unit (display panel), thereby reducing problems due to the contact. However, when bend or deformation occurs in the optical sheet of U.S. Pat. No. 5,771,328, the contact area of the optical sheet with an adjacent member can become considerably large, and this such a bend or deformation makes it impossible to sufficiently obscure a fringe like pattern. Furthermore, the production of the optical sheet disclosed in U.S. Pat. No. 5,771,328 is difficult because of the complicated shape of prisms, and this difficulty in the production makes it also difficult to lower the production cost.

With reference to the optical sheet disclosed in JP 8-304608A, the contour of the top of each unit prism (unit shaped element) undulates continuously and moderately in the ridge line direction. Accordingly, the optical sheet makes contact with another member only in the locally high portions of the unit prisms. The techniques disclosed in JP 8-304608A are to decrease the contact area between the optical sheet and another member and to position most of the ridge portion of each unit prism at a distance from a display unit, thereby reducing problems due to the contact. However, it is technically difficult to sharply change the height of each unit prism in an optical sheet as disclosed in JP 8-304608A. Thus, the change in the height of the unit prisms of the optical sheet mentioned in JP 8-304608A should practically be quite moderate, and this moderate change makes it impossible to achieve a sufficiently small contact are between the optical sheet and another member. Further, the contact area between the optical sheet of JP 8-304608A and an adjacent member will become considerably large when the contact pressure between them increases due to deformation of the optical sheet caused e.g. by moisture absorption or thermal expansion. Thus, the optical sheet disclosed in JP 8-304608A also sometimes cannot sufficiently obscure a fringe like pattern. In addition, the production of the optical sheet disclosed in JP 8-304608A is difficult, and this difficulty in the production makes it also difficult to lower the production cost.

SUMMARY OF THE INVENTION

The present invention has been made in view of the above situation. It is therefore a first object of the present invention to provide at a low cost and with technical ease an optical sheet that has unit shaped elements and can alleviate or overcome the problems, such as a fringe like pattern, wetting pattern, etc., which have been encountered when a conventional optical sheet is superimposed on another member. It is also a first object of the present invention to provide a surface light source device and a transmission type display device, each having the optical sheet.

The present inventors have found that the first object can be achieved by an optical sheet having an internal light diffusing layer, as will be described in detail below. The present inventors have also found through intensive studies that an excellent optical function can be imparted to the optical sheet by the construction of the internal light diffusing layer. Thus, it is a second object of the present invention to provide an optical sheet provided with an excellent optical function, and to provide a surface light source device and a transmission type display device, each having the optical sheet.

In recent years, display devices are rapidly becoming larger as they become thinner. When a viewer watches an image on a large-sized display device, the angle of a direction in which the viewer watches the image with respect to the normal direction of the display surface (referred to simply as "watching angle") varies greatly depending on the position of the image on the display surface. Further, some large-sized display devices are set up in a public space; a wide view angle is required of such display devices. It is therefore important for a large-sized display device to have a smooth and gentle angular distribution of luminance and a wide viewing angle. It is very favorable if the optical sheet, the surface light source device and the transmission type display device according to the present invention can achieve a smooth angular distribution of luminance and a wide viewing angle without entailing a significant lowering of the front direction luminance.

A first optical sheet according to the present invention comprises: a sheet-like base layer; a light control layer having unit shaped elements arranged in a direction parallel to a sheet surface of the base layer; and a light diffusing layer disposed between the base layer and the light control layer, wherein the light diffusing layer has a binder resin portion and particles dispersed in the binder resin portion, and wherein the particles contained in the binder resin portion include an aggregate of aggregated single particles. The first optical sheet of the present invention can effectively prevent the occurrence of problems due to contact of the unit shaped elements of the optical sheet with another member.

In the first optical sheet according to the present invention, a surface, on a side of the light control layer, of the light diffusing layer may be a rough surface having raised portions; a refractive index of the binder resin portion of the light diffusing layer may differ from a refractive index of a layer adjacent, from a side of the light control layer, to the light diffusing layer; and an average value of radii of curvature at tops of the raised portions may differ from an average value of radii of granulated substances, the granulated substances being formed of the aggregate or the single particles and existing in the light diffusing layer.

A second optical sheet according to the present invention comprises: a sheet-like base layer; a light control layer having unit shaped elements arranged in a direction parallel to a sheet surface of the base layer; and a light diffusing layer disposed between the base layer and the light control layer, wherein the light diffusing layer has a binder resin portion and particles dispersed in the binder resin portion, wherein a surface, on a side of the light control layer, of the light diffusing layer is a rough surface having raised portions; wherein a refractive index of the binder resin portion of the light diffusing layer differs from a refractive index of a layer adjacent, from a side of the light control layer, to the light diffusing layer; and wherein an average value of radii of curvature at tops of the raised portions differs from an average value of radii of granulated substances, the granulated substances being formed of the aggregate or the single particles and existing in the light diffusing layer. The second optical sheet of the present invention can be provided with an excellent optical function.

In the first or second optical sheet according to the present invention, the average value of radii of curvature at tops of the raised portions may be lower than the average value of radii of the granulated substances in the light diffusing layer. Alternatively, in the first or second optical sheet according to the present invention, the average value of radii of curvature at tops of the raised portions may be higher than the average value of radii of the granulated substances in the light diffusing layer.

In the first or second optical sheet according to the present invention, an internal diffusion value of the light diffusing layer, which indicates a degree of light diffusion by the light diffusing layer in the optical sheet and which is expressed in terms of a haze value, is preferably not less than 20, more preferably not less than 35.

In the first or second optical sheet according to the present invention, an internal transmittance of the light diffusing layer, which indicates a degree of a proportion of light transmitted through the light diffusing layer in the optical sheet and which is expressed in terms of a sum of image definition values measured by using a 0.125-mm optical comb, a 0.5-mm optical comb, a 1.0-mm optical comb and a 2.0-mm optical comb, is preferably not more than 350, more preferably not more than 230.

In the first or second optical sheet according to the present invention, the light diffusing layer may be disposed between the base layer and the light control layer such that the light diffusing layer is adjacent both to the base layer and to the light control layer, and the light control layer may be disposed on an outermost light outgoing side.

In the first or second optical sheet according to the present invention, a surface, on a side of the light control layer, of the light diffusing layer may be a rough surface.

In the first or second optical sheet according to the present invention, a ratio of a linear expansion coefficient of a material of the binder resin portion of the light diffusing layer, as measured when heating the material from 20° C. to 80° C., relative to a linear expansion coefficient of a material of the light control layer, as measured when heating the material from 20° C. to 80° C., may be not more than 1500%

In the first or second optical sheet according to the present invention, a difference in glass transition temperature between a material of the light control layer and a material of the binder resin portion of the light diffusing layer may be not more than 30° C.

A first surface light source device according to the present invention comprises: a light source; and one of the above-described first and second optical sheets according to the present invention which receives light from the light source.

In the first surface light source device according to the present invention, the optical sheet may be disposed such that a surface formed by the unit shaped elements of the light control layer constitutes a light emitting surface.

A second surface light source device according to the present invention comprises: a light source including luminous tubes; a light incident side optical sheet, which is one of the above-described first and second optical sheets according to the present invention, disposed in a position facing the light source; and a light outgoing side optical sheet, which is one of the above-described first and second optical sheets according to the present invention, disposed on a light outgoing side of the light incident side optical sheet, wherein the unit shaped elements of the light control layer of the light incident side optical sheet extend linearly in a direction intersecting an arrangement direction thereof, wherein the unit shaped elements of the light control layer of the light outgoing side optical sheet extend linearly in a direction intersecting an arrangement direction thereof, and wherein the arrangement direction of the unit shaped elements of the light incident side optical sheet intersects the arrangement direction of the unit shaped elements of the light outgoing side optical sheet.

In the second surface light source device according to the present invention, the arrangement direction of the unit shaped elements of the light incident side optical sheet may be perpendicular to an arrangement direction of the luminous tubes, and the arrangement direction of the unit shaped elements of the light outgoing side optical sheet may be parallel to the arrangement direction of the luminous tubes.

A transmission type display device according to the present invention comprises: a transmission type display unit; and one of the above-described first and second surface light source devices according to the present invention, disposed to be opposed to the transmission type display unit.

In the transmission type display device according to the present invention, the transmission type display unit may have a smooth surface as a light incident side surface facing the surface light source device, and the optical sheet of the surface light source device may be disposed such that the unit shaped elements of the light control layer are in contact with the smooth surface of the transmission type display unit.

BRIEF DESCRIPTION OF THE DRAWINGS

FIG. 21 shows diagrams showing some examples of the results of measurement of the distribution of luminance in the display surface of a display device; and FIG. 22 shows diagrams showing some other examples of the results of measurement of the distribution of luminance in the display surface of a display device.

DETAILED DESCRIPTION OF THE INVENTION

Figure 1:
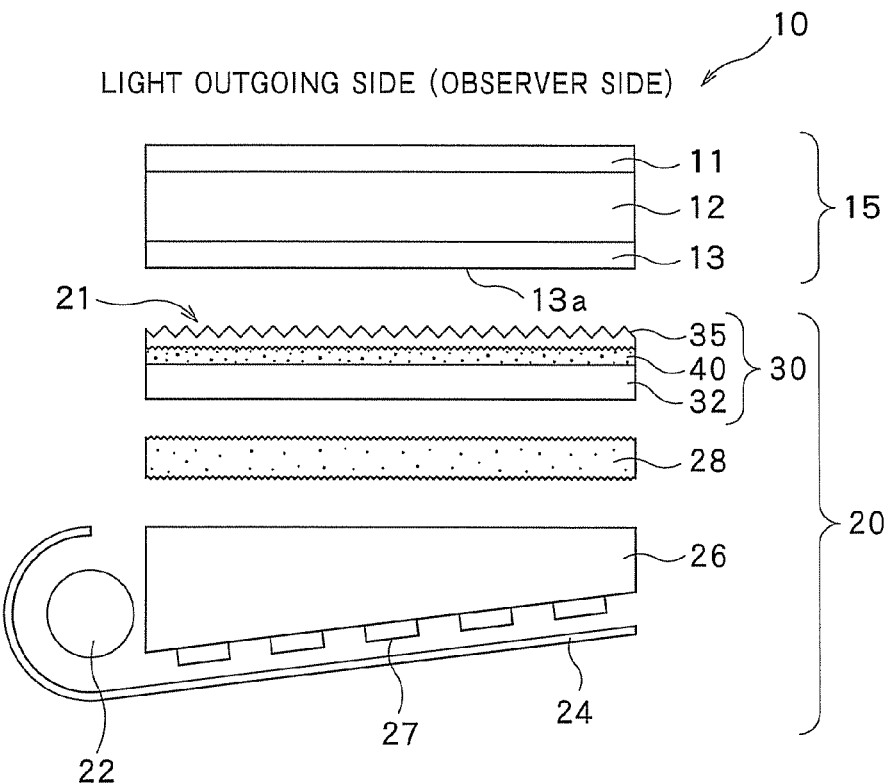
FIG. 1 is a cross-sectional view showing the schematic construction of a transmission type display device and a surface light source device according to an embodiment of the present invention.

Preferred embodiments of the present invention will now be described with reference to the drawings. FIGS. 1 through 8 illustrate an embodiment of the present invention. In the drawings, for the sake of illustration and easier understanding, scales, horizontal to vertical dimensional ratios, etc. are exaggeratingly modified from those of the real things.

Figure 2:
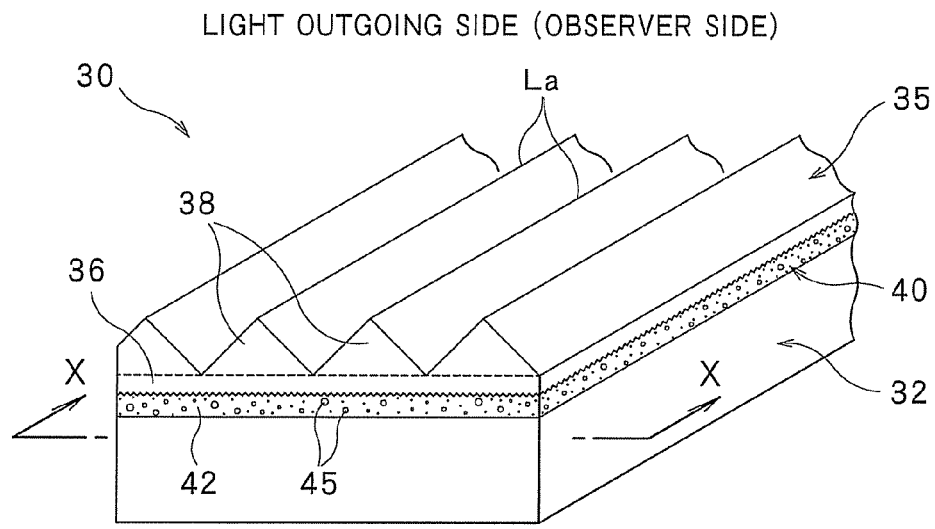
FIG. 2 is a perspective view of an optical sheet incorporated in the surface light source device shown in FIG. 1.

The construction of a display device, a surface light source device and an optical sheet according to this embodiment will be described first mainly with reference to FIGS. 1 and 2. FIG. 1 is a cross-sectional view showing the schematic construction of the transmission type display device and the surface light source device of this embodiment; and FIG. 2 is a perspective view of the optical sheet.

As shown in FIG. 1, the transmission type display device 10 includes a transmission type display unit (transmission type display section) 15 and the surface light source device 20, disposed on the back side of the transmission type display unit 15, for planarly illuminating the transmission type display unit 15 from the back. The transmission type display unit 15 can be selected from various types. For example, the transmission type display unit 15 may be comprised of a liquid crystal display panel (LCD panel); and in this case, the transmission type display device 10 functions as a liquid crystal display device. The LCD panel includes an upper polarizing plate 11 disposed on the light outgoing side (light exiting side, light emerging side), a lower polarizing plate 13 disposed on the light incident side (light entrance side, light inputting side), and a liquid crystal cell 12 disposed between the upper polarizing plate 11 and the lower polarizing plate 13.

The liquid crystal cell 12 is a member including a pair of support plates, e.g. made of glass, a liquid crystal disposed between the support plates, and an electrode for controlling the orientation of liquid crystal molecules by an electric field for each pixel region. The liquid crystal between the support plates is designed to be capable of changing the orientation for each pixel region. The transmission type display panel 15 thus functions as a shutter which controls the transmission and blocking of light from the surface light source device 20 for each pixel so as to form an image.

As shown in FIG. 1, the light incident side surface of the transmission type display unit 15 is constituted by the light incident side surface of the lower polarizing pate 13. In this embodiment the light incident side surface 13a of the lower polarizing plate 13, facing the surface light source device 20, is a smooth surface. Further, in this embodiment no light diffusing member intervenes between the lower polarizing plate 13 of the transmission type display unit 15 and the optical sheet 30 located on the outermost light outgoing side of the surface light source device 20, as shown in FIG. 1.

The term "smooth (smooth surface)" herein refers to smoothness in an optical sense. In particular, the term "smooth (smooth surface)" refers to such a degree of smoothness of a surface that a certain proportion of visible light is refracted at the surface (e.g. the light incident side surface 13a of the lower polarizing plate 13) while satisfying the Snell's law. Thus, a surface will sufficiently meet the definition of "smooth" if the 10-point average roughness Rz (JIS B0601) of the surface is not more than the shortest visible light wavelength (0.380 μm).

Similarly, the term "rough surface" herein refers to a rough surface in an optical sense. In particular, the term "rough surface" refers to a surface having such a degree of surface roughness that a certain proportion of visible light is scattered by the surface roughness. Thus, a surface will sufficiently meet the definition of "rough surface" if the 10-point average roughness Rz (JIS B0601) of the surface is not less than the longest visible light wavelength (0.780 μm).

The surface light source device 20 will now be described. As shown in FIG. 1, the surface light source device 20 includes a light source 22, and the optical sheet 30 for deflecting light (change_in travel direction of light) from the light source 22 and transmitting the light therethrough. In this embodiment the optical sheet 30 is disposed on the outermost light outgoing side of the surface light source device 20 and forms a light emitting surface (light outgoing side surface) 21. Thus, as described above, no light diffusing member are interposed between the optical sheet 30 of the surface light source device 20 and the lower polarizing plate 13 disposed on the outermost light incident side of the transmission type display unit 15.

In the embodiment shown in FIG. 1, a light diffusing sheet 28 for disusing light is disposed on the light incident side of the optical sheet 30, and a light guide plate 26 is disposed on the light incident side of the light diffusing sheet 28. The light source 22 extends linearly besides the light guide plate 26. Thus, in the embodiment shown in FIG. 1, the surface light source device 20 is constructed as a so-called edge light (side light) type. The present invention, however, is not limited to such an edge light-type surface light source device 20, but is applicable also to a direct-type surface light source device or area light-type surface light source device.

The term "light outgoing side (light exiting side, light emerging side)" herein refers to downstream side (observer side (viewer side), and upper side in FIGS. 1 through 4, etc.) in the travel direction of light that travels from the light source 22 toward an observer (viewer), passing through the optical sheet 30, etc., without turning back. The term "light incident side (light entrance side, light inputting side)" herein refers to upstream side in the travel, direction of light that travels from the light source 22 toward a observer, passing through the optical sheets 30, etc., without turning back. The terms "sheet", "film" and "plate" are not used herein to strictly distinguish them from one another. Thus, for example, the term "sheet" is concept including a member which can also be called film or plate.

As shown in FIG. 1, the light guide plate 26 has a generally wedge-like shape, and thickness of the light guide plate 26 decreases with distance from the light source 22. Each white dot pattern 27, whose area increases with distance from the light source 22, is formed on the back surface of the light guide plate 26. A light reflector 24 for reflecting light, which leaks from the light guide plate 26, back toward the transmission type display unit 15 is disposed behind the light guide plate 26. The light source 22 is, for example, comprised of a linear fluorescent tube, such as a cold cathode fluorescent lamp. The light reflector 24, at least in the inner surface, is made of a material having a high reflectance, such as a metal.

The light diffusing sheet 28 is a sheet-like member for diffusing incident light preferably isotropically so as to reduce luminance variation due to the construction of the light source 22 and equalize the in-plane distribution of luminance. The light diffusing sheet 28 also prevents a visible image of the white dot patterns 27 from being displayed. As the light diffusing sheet 28 may be used a sheet comprising a base and light diffusing particles dispersed in the base and having a light diffusing function. A light diffusing function can be imparted to the light diffusing sheet 28 e.g. by using light diffusing particles of a high-reflectance material, or by using light diffusing particles having a different refractive index from that of the base material. In order to prevent close contact with the light guide plate 26, the light incident side surface of the light diffusing sheet 28 preferably is a rough surface as shown in FIG. 1. Similarly, in order to prevent close contact with the optical sheet 30, the light outgoing side surface of the light diffusing sheet 28 preferably is a rough surface.

The optical sheet 30 will now be described. As shown in FIG. 2, the optical sheet 30 includes a sheet-like base layer 32, a light control layer 35 having a large number of unit shaped elements (also called unit optical elements, or unit prisms or unit lenses) 38 arranged side by side in a direction parallel to the sheet surface of the optical sheet 30, and a light diffusing layer 40 disposed between the base layer 32 and the light control layer 35. In this embodiment the light diffusing layer 40 is disposed between the base layer 32 and the light control layer 35 such that the light diffusing layer 32 is adjacent both to the base layer 32 and to the light control layer 35. The optical sheet 30 of this embodiment is composed of the three layers 32, 35, 40. The optical sheet 30 has a function (light condensing function, light collecting function), caused by the action of the unit shaped elements 38 on transmitted light, to change the travel direction of light incident on the light incident side of the optical sheet 30 and allow the light exit from the light outgoing side of the optical sheet, thereby to intensively enhance the luminance in the front direction (normal direction) nd.

The term "sheet surface (film surface, plate surface)" herein refers to a surface which coincides with the planar direction of an objective sheet-like member when taking a perspective and overall view of the sheet-like member. In the case of the light control layer 35 having the large number of unit shaped elements 38 arranged side by side, the envelope surface of the ridges of the unit shaped elements 38 can be the sheet surface of the layer. In this embodiment the sheet surface of the optical sheet 30, the sheet surfaces of the layers 32, 35, 40 of the optical sheet 30, the sheet surface of the light diffusing sheet 28, the light emitting surface 21 of the surface light source device 20 and the display surface of the transmission type display device 10 are parallel to each other. The term "front direction" herein refers to the normal direction nd (see e.g. FIG. 3) of the sheet surface of the optical sheet 30, and coincides with the normal direction of the light emitting surface 21 of the surface light source device 20, etc.

The base layer 32 is disposed on the outermost light incident side of the optical sheet 30. The light incident side surface of the base layer 32, constituting the outermost light incident side surface of the optical sheet 30, is a smooth surface in this embodiment. The light outgoing side surface of the base layer 32 is also a smooth surface. Thus, the base layer 32 is comprised of a sheet-like member whose light incident side surface and light outgoing side surface are both smooth. The entire light outgoing side surface of the base layer 32 is in close contact with the light diffusing layer 40. Thus, the light incident side surface of the light diffusing layer 40 is a smooth surface, and the interface between the base layer 32 and the light diffusing layer 40 is a smooth surface. In this embodiment the base layer 32 contains no particles, and therefore the base layer 32 of this embodiment is not provided with a light diffusing function.

On the other hand, the light control layer 35 is disposed on the outermost light outgoing side of the optical sheet 30. As shown in FIG. 2, in this embodiment the light control layer 35 includes a sheet-like support portion 36 disposed on the light diffusing layer 40. The support portion 36 functions as a portion for supporting the above-described unit shaped elements 38. While the interface between the support portion 36 and the unit shaped elements 38 is shown by the broken line in FIG. 2, the support portion 36 may be formed integrally with the unit shaped elements 38, or the support portion 36, as will be described later. Alternatively and the unit shaped elements 38 may be formed separately using the same material.

In this embodiment the light incident side surface of the light control layer 35, i.e. the light incident side surface of the support portion 36, is a rough surface having irregularities. The entire light incident side surface of the light control layer 35 (support portion 36) is in close contact with the light diffusing layer 40. Thus, the light outgoing side surface of the light diffusing layer 40 is a rough surface having irregularities, and the interface between the light control layer 35 and the light diffusing layer 40 is a rough surface. The uneven interface between the light control layer 35 and the light diffusing layer 40 enables the optical sheet 30 to perform an excellent optical function.

As shown in FIG. 2, the unit shaped elements 38 are arranged side by side, with no space therebetween, on the light outgoing side surface of the support portion 36 and project toward the light outgoing side surface. Therefore, as shown in FIG. 1, the unit shaped elements 38 of the light control layer 35 make contact with the smooth surface 13a of the lower polarizing plate 13 of the transmission type display unit 15. The unit shaped elements 38 extend linearly in a direction (the direction perpendicular to the plane of the paper of FIG. 1) intersecting the arrangement direction of the unit shaped elements 38. In this embodiment the unit shaped elements 38 extend in a straight line. Further, the longitudinal direction of the unit shaped elements 38 (the direction in which the elements extend in a straight line) is perpendicular to the arrangement direction of the unit shaped elements 38 on the sheet surface of the optical sheet 30. Further, in this embodiment, when viewed in the normal direction nd of the sheet surface of the optical sheet 30, the arrangement direction of the unit shaped elements 38 is perpendicular to the longitudinal direction of the light source 22, and the longitudinal direction of the unit shaped elements 38 is parallel to the longitudinal direction of the light source 22.

Figure 3:
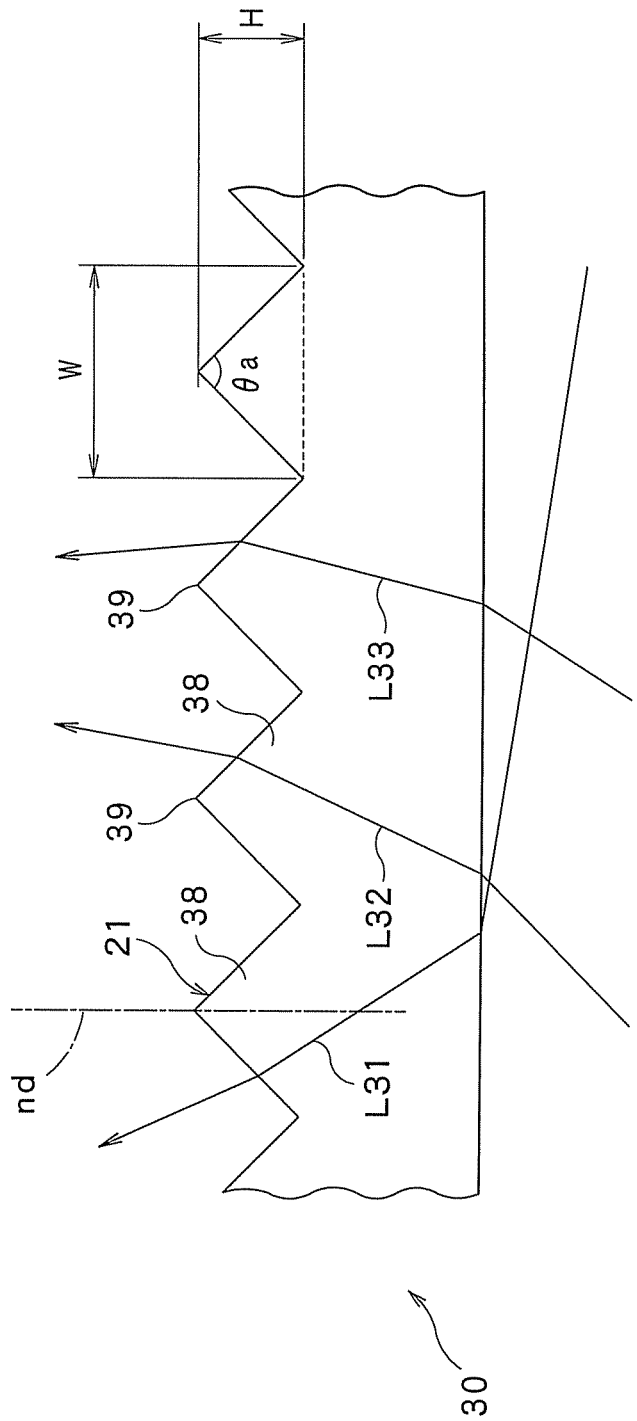
FIG. 3 is a cross-sectional view of the optical sheet shown in FIG. 2 in the main cross-section, for explaining the function of the optical sheet in its light control layer.
Figure 4:
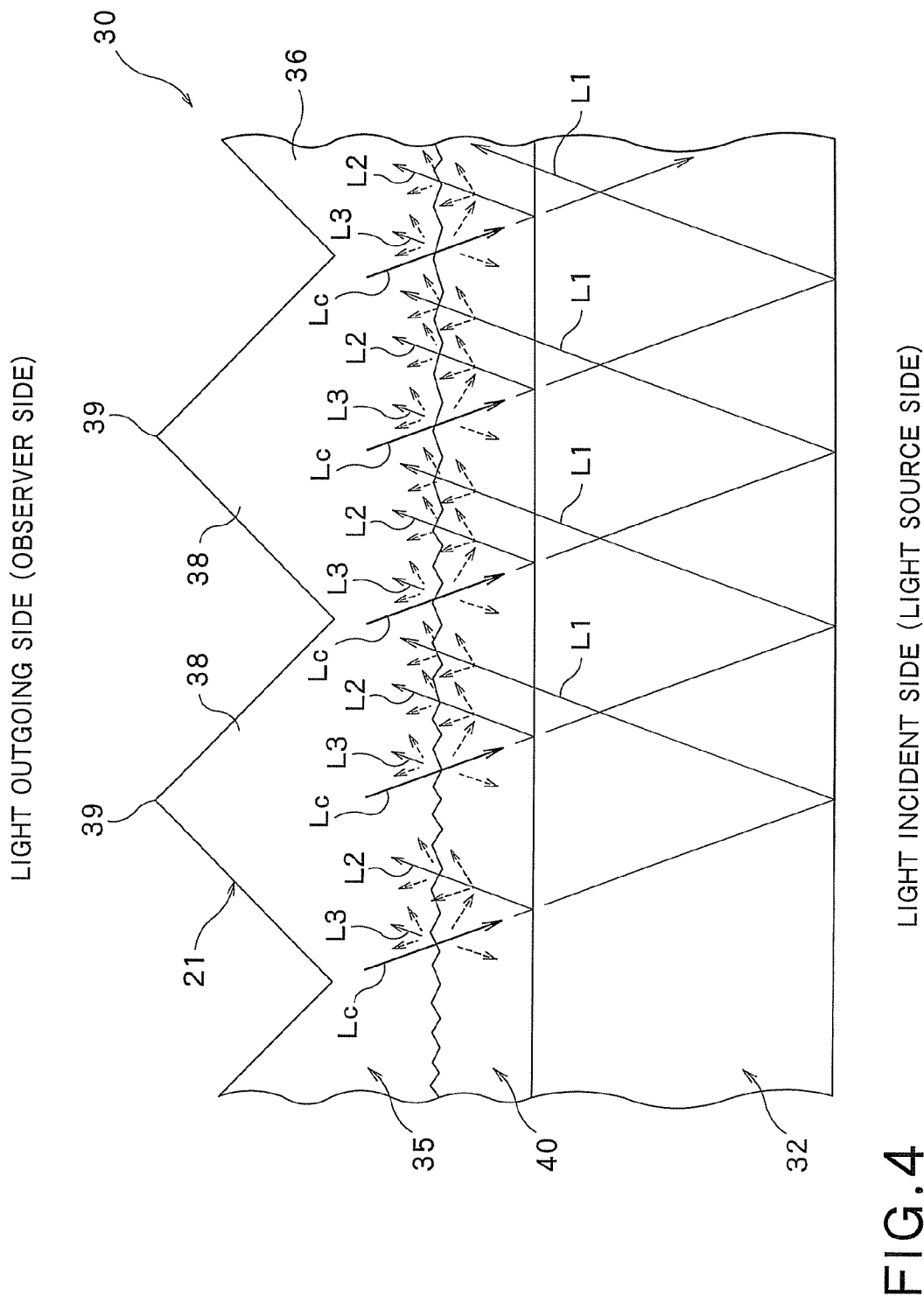
FIG. 4 is a cross-sectional view of the optical sheet of FIG. 2 in the main cross-section, for explaining the function of the optical sheet in its light diffusing layer.

FIGS. 3 and 4 show the optical sheet 30 in a cross-section (also referred to as the main cross-section) which is parallel both to the normal direction nd of the sheet surface of the optical sheet 30 and to the arrangement direction of the unit shaped elements 38. The cross-section shown in FIGS. 3 and 4 corresponds to the cross-section taken along the line X-X of FIG. 2. As shown in FIGS. 3 and 4, in this embodiment each unit shaped element 38 has a triangular cross-sectional shape, projecting toward the light outgoing side. Thus, each unit shaped element 38 is designed as a triangular unit prism. In particular, from the viewpoint of intensively enhancing the front direction luminance, each unit shaped element 38 is designed such that the cross-sectional shape in the main cross-section is an isosceles triangle in which the vertex corner between the two equal sides projects toward the light outgoing side.

The term "triangular shape" herein includes not only a triangular shape in the strict sense but also a generally triangular shape that may reflect limitations in production technique, a molding error, etc., and a generally triangular shape from which the same optical effect as a triangular shape can be expected. For instance, the "triangular shape" includes a triangle with a rounded apex.

The term "prism" herein not only includes a prism in the narrow sense but broadly includes a unit shaped element (unit optical element) that may be called lens.

As shown in FIG. 2, each unit shaped prism 38 has a ridge line La which coincides a line defined by joining the tops 39, the farthest points from the support portion 36, of the cross-sectional shapes of each unit shaped prism 38 in the main cross-section. In this embodiment the cross-sectional shape of each unit shaped element 38 in the main cross-section is constant along the longitudinal direction of each unit shaped element 38. Accordingly, the ridge line La of each unit prism 38 extends parallel to the sheet surface of the optical sheet 30 and also parallel to the longitudinal direction of the unit shaped element 38. Further, all the unit shaped elements 38 have the same construction. Accordingly, all the ridge lines La of the unit shaped elements 38 lie in the same surface parallel to the sheet surface of the optical sheet 30, and come into contact with the light incident side surface 13a of the transmission type display unit 15 when the optical sheet 30 is incorporated into the display device 10.

In this embodiment the light control layer 35, i.e. the support portion 36 and the unit shaped elements 38, contain no particles or the like, and therefore the light control layer 35 of this embodiment is not provided with a light diffusing function.

With reference to the unit shaped elements 38 having the above construction, the width W (see FIG. 3) of the bottom of each unit shaped element 38 on the light outgoing side surface of the support portion 36 in the arrangement direction of the unit shaped elements 38 may be, for example, 5 μm to 200 μm. The height H (see FIG. 3) of each unit shaped element 38 from the light outgoing side surface of the support portion 36 in the normal direction nd of the sheet surface of the optical sheet 30 may be, for example, 1.445 μm to 173 μm. When the cross-sectional shape of each unit shaped element 38 is an isosceles triangle, the apex angle θa (see FIG. 3) at the apex lying between the equal sides is preferably not less than 60° and not more than 120°, and more preferably 90° from the viewpoint of intensively enhancing the front direction luminance.

A description will now be given of the light diffusing layer 40 disposed between the base layer 32 and the light control layer 35. As described above, the light incident side surface of the light diffusing layer 40, facing the base layer 32, is a smooth surface, while the light outgoing side surface of the light diffusing layer 40, facing the light control layer 35, is a rough surface having irregularities.

The light diffusing layer 40 comprises a binder resin portion 42 and light diffusing particles 45 dispersed in the binder resin portion 42. The light diffusing particles 45 function to change the travel direction of light, traveling in the light diffusing layer 40, through reflection or refraction. Such a light diffusing function of the light diffusing particles 45 can be performed by using for the light diffusing particles 45 a material having a different refractive index from that of the material of the binder resin portion 42 or a material that can exert a reflecting action on light. The light diffusing particles 45 can effectively perform a light diffusing function when the difference in refractive index between the light diffusing particles 45 and the binder resin portion 42 is not less than 0.1, preferably not less than 0.2.

The binder resin portion 42 may be made of either the same material as or a different material from the material of the base layer 32. Similarly, the binder resin portion 42 may be made of either the same material as or a different material from the material of the light control layer 35 (support portion 36). When the material of the binder resin portion 42 and the material of the light control layer 35 (support portion 36) have different refractive indices, it becomes possible to diffuse light also at the interface between the light diffusing layer 40 and the light control layer 35 by designing the interface as a rough surface. Especially when the difference in refractive index between the binder resin portion 42 and the adjacent light control layer 35 (support portion 36) is not less than 0.1, preferably not less than 0.2, the uneven rough interface between the light control layer 35 and the light diffusing layer 40 enables the optical sheet 30 to perform an excellent optical function.

Figure 5A:
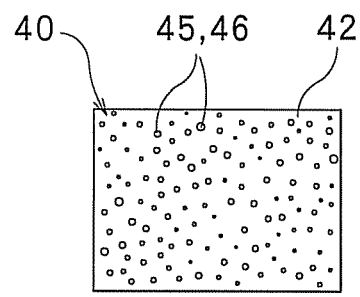
FIG. 5A is a schematic diagram illustrating various states of light diffusing particles in a binder resin portion, as generally observed by means of an electron microscope.
Figure 5B:
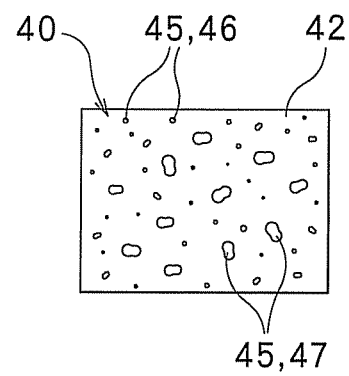
FIG. 5B is a schematic diagram illustrating various states of light diffusing particles in a binder resin portion, as generally observed by means of an electron microscope.
Figure 5C:
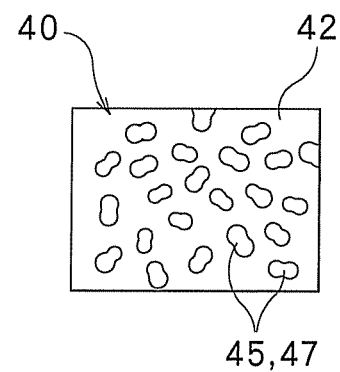
FIG. 5C is a schematic diagram illustrating various states of light diffusing particles in a binder resin portion, as generally observed by means of an electron microscope.

The light dispersing particles 45 contained in the binder resin portion 42 of the light diffusing layer 40 include aggregates (agglomerates, composite particles, secondary composites, secondary particles) 47 of at least two single particles 46 which aggregate into. The number of single particles constituting or aggregating into one aggregate (composite particle) may be appropriately selected depending on the intended light diffusing property; however, the number is generally about 2 to 1000. The numbers of single particles constituting aggregates may be the same for all the aggregates (composite particles) contained in the light diffusing layer 40, or may have a distribution such as a normal distribution. FIGS. 5A through 5C illustrate various states of light diffusing particles in a binder resin portion, as generally observed with an electron microscope. Of these figures, FIGS. 5B and 5C illustrate the exemplary states of light diffusing particles 45 in the binder resin portion 42 of the light diffusing layer 40 in this embodiment. With reference to the state of particles shown in FIG. 5B, part of the light diffusing particles 45 remain as single particles 46, and the remainder of the light diffusing particles 45 exist as aggregates 47. With reference to the state of particles shown in FIG. 5C, all the light diffusing particles 45 exist as aggregates 47 formed of aggregated particles in the binder resin portion 42.

With reference to the state of particles shown in FIG. 5A, all the light diffusing particles 45 exist as single particles 46 in the binder resin portion 42.

The degree of aggregation of light diffusing particles 45 can be adjusted by modifying conditions for the production of the light diffusing layer 40, as will be described later.

In this embodiment the light diffusing layer 40 is designed to have an internal diffusion value of not less than 20 and not more than 70, preferably an internal diffusion valve of not less than 35 and not more than 70. In addition, in this embodiment the light diffusing layer 40 is designed to have an internal transmittance of not less than 70 and not more than 350, preferably an internal transmittance of not less than 70 and not more than 230. It has been confirmed by the present inventors that when the internal diffusion value of the light diffusing layer 40 falls within the above range, or when the internal transmittance of the light diffusing layer 40 falls within the above range, the binder resin portion 42 of the light diffusing layer 40 either contains solely aggregates (agglomerates, composite particles, secondary particles) 47 of aggregated single particles 46 or contains both aggregates 47 and single particles 46 in a form and at an amount especially suited to achieve the advantageous effects of the present invention.

Though the details of the principle or mechanism have not yet been fully clarified, it may be considered that when particles, dispersed in a light diffusing layer, exist in the form of such aggregates 47, the light diffusing layer, compared to a conventional known layer containing solely single particles 46, can diffuse external incident light (light rays or beams) in such a manner as to effectively reduce the periodic modulation of light coherence and intensity which is considered to cause the problematic fringe like pattern.

The "internal diffusion value of a light diffusing layer 40 in an optical sheet 30" and the "internal transmittance of a light diffusing layer 40 in an optical sheet 30" will now be described. The internal diffusion value of a light diffusing sheet 40 will be described first, followed by a description of the internal transmittance of a light diffusing layer 40.

The internal diffusion value of a light diffusing layer 40 in an optical sheet 30 represents the degree of light diffusion by the light diffusing layer 40 as incorporated in the optical sheet 30. In particular, the internal diffusion value represents the degree of light diffusion by the light diffusing layer 40 on the basis of the diffusion of light at the interface between the light diffusing layer 40 and a layer adjacent, from the light incident side, to the light diffusing layer 40, the diffusion of light within the light diffusing layer 40, and the diffusion of light at the interface between the light diffusing layer 40 and a layer adjacent, from the light outgoing side, to the light diffusing layer 40. A haze value, measured in accordance with JIS K7105, is used as an index of the degree of light diffusion. Thus, The internal diffusion valve of a light diffusing layer 40 in an optical sheet corresponds to the total sum of the degree of light diffusion at the interface between the light diffusing layer 40 and a layer adjacent to the light incident side of the light diffusing layer 40, the degree of light diffusion within the light diffusing layer 40, and the degree of light diffusion at the interface between the light diffusing layer 40 and a layer adjacent to the light outgoing side of the light diffusing layer 40, and is expressed in terms of a haze value measured in accordance with JIS K7105.

A method for measuring the internal diffusion value of the light diffusing layer 40 in the optical sheet 30 of this embodiment will now be described. In the optical sheet 30 of this embodiment, the unit shaped elements 38 of the light control layer 35 also function to change the travel direction of light. In determining the internal diffusion value of the light diffusing layer 40, therefore, a sample which can eliminate the light diffusion by the unit shaped elements 38 of the light control layer 35 is produced, and the haze value of the sample is measured in accordance with JIS K7105.

Figure 6:
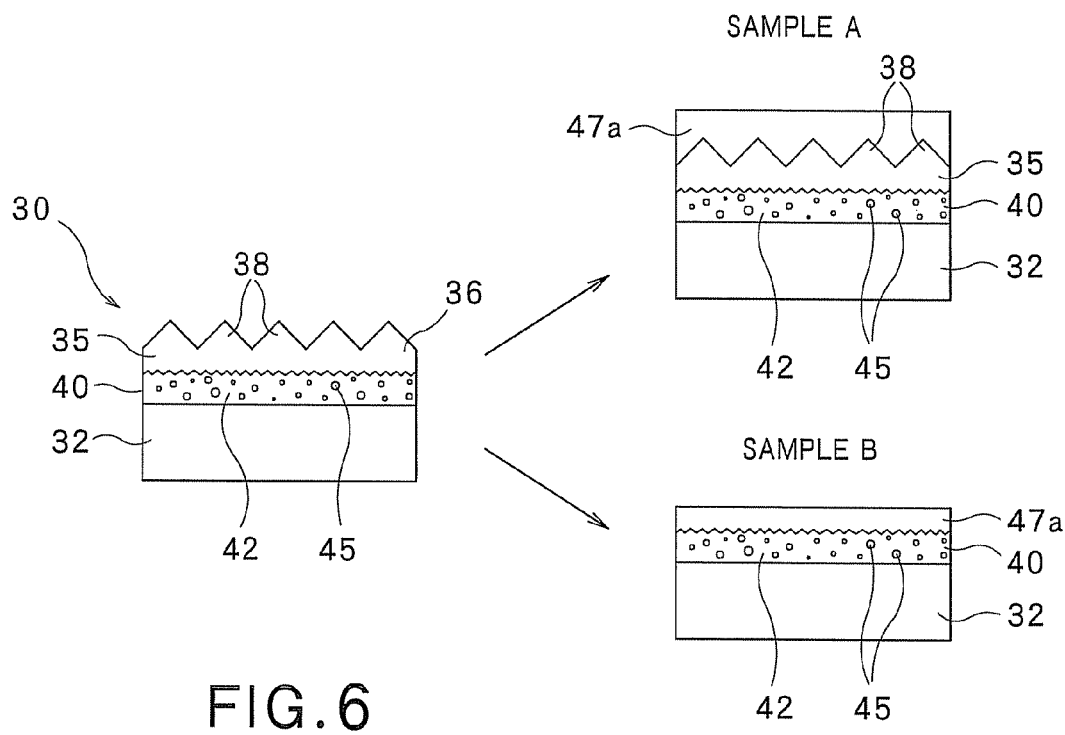
FIG. 6 is a diagram illustrating samples to be measured an internal diffusion value.

More specifically, as a sample for haze value measurement, a sample A shown in FIG. 6 can be used. As shown in FIG. 6, the sample A is produced by flattening (filling) the surface irregularities on the light outgoing side of the optical sheet 30, which is formed by the unit shaped elements 38 of the light control layer 35, with a material 47a having the same refractive index as that of the material of the light control layer 35 (unit shaped elements 38). Alternatively, as a sample for haze value measurement a sample B shown in FIG. 6, can be used. The sample B is produced by coating the light diffusing layer 40 with the material 47a having the same refractive index as that of the material of the light control layer 35 (unit shaped elements 38) instead of forming the light control layer 35 on the light diffusing layer 40. The light outgoing side surfaces of the sample A and the sample B are both parallel to the sheet surface of the optical sheet 30.

With respect to the optical sheet 30 of this embodiment, the internal diffusion value of the light diffusing layer 40 can be determined by a method other than the above-described method. More specifically, a sample, which can present the degree of light diffusion by the unit shaped elements 38 of the light control layer 35, is produced first. Next, the haze value of the optical sheet 30 and the haze value of the sample, which can present the degree of light diffusion by the unit shaped elements 38 of the light control layer 35, are measured in accordance with JIS K7105. The internal diffusion value of the light diffusing layer 40 in the optical sheet 30 can be determined by subtracting the haze value of the sample from the haze value of the optical sheet 30. A sample having, in the light outgoing side surface, unit shaped elements (unit optical elements) of the same construction as the unit shaped elements 38 of the light control layer 35 and having a smooth light incident side surface, and solely made of a material having the same refractive index as that of the material of the light control layer 35 (unit shaped elements 38), can be used as the sample which can present the degree of light diffusion by the unit shaped elements 38 of the light control layer 35.

Figure 7:
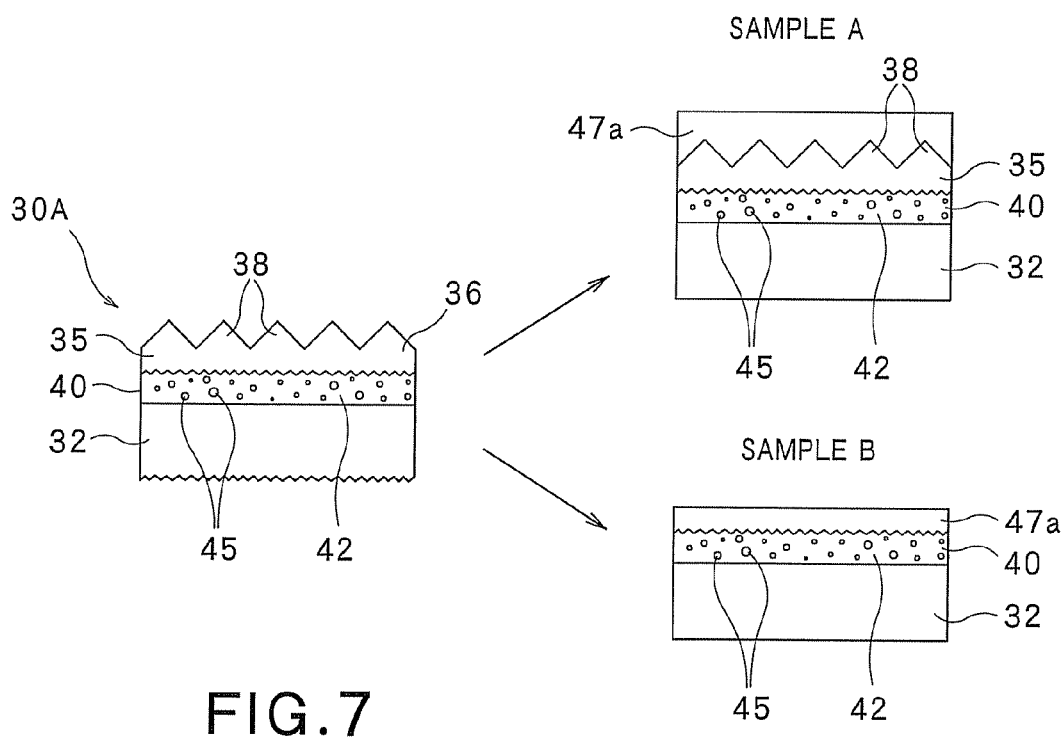
FIG. 7 is a diagram illustrating samples to be measured an internal diffusion value.

A study will now be made of the internal diffusion value of the light diffusing layer 40 in the optical sheet 30A shown in FIG. 7. The optical sheet 30A shown in FIG. 7 differs from the above-described optical sheet 30 of this embodiment only in that the base layer 32 has a rough light incident side surface. Therefore, the optical sheet 30A shown in FIG. 7 and the optical sheet 30 of this embodiment are equal in the degree of light diffusion at the interface between the light diffusing layer 40 and the layer adjacent, from the light incident side, to the light diffusing layer 40, in the degree of light diffusion within the light diffusing layer 40, and in the degree of light diffusion at the interface between the light diffusing layer 40 and the layer adjacent, from the light outgoing side, to the light diffusing layer 40. The internal diffusion value of the light diffusing layer 40 in the optical sheet 30A shown in FIG. 7 can therefore be determined by using the sample A or B shown in FIG. 6. The internal diffusion value of the light diffusing layer 40 in the optical sheet 30A shown in FIG. 7 is identical to the internal diffusion value of the light diffusing layer 40 in the above-described optical sheet 30 of this embodiment.

As will be appreciated from the above, the internal diffusion value of a light diffusing layer 40 in an optical sheet 30 can be determined in the following manner: First, a sample for haze measurement is produced. The sample is composed of a central layer having the same construction as the light diffusing layer 40, a first adjacent layer disposed adjacent to one side of the central layer, and a second adjacent layer disposed adjacent to the other side of the central layer. The first adjacent layer can be a single layer which is made of the same material as the material of a substrate (base portion), constituting a layer adjacent from the light incident side, to the light diffusing layer 40 in the optical sheet 30, and whose surface on the side opposite to the central layer-facing side is a smooth surface extending along the sheet surface of the sample. The second adjacent layer can be a single layer which is made of the same material as the material of a substrate (base portion), constituting a layer adjacent, from the light outgoing side, to the light diffusing layer 40 in the optical sheet 30, and whose surface on the side opposite to the central layer-facing side is a smooth surface extending along the sheet surface of the sample. The haze value of the sample, measured in accordance with JIS K7105, is the internal diffusion value of the light diffusing layer 40 in the optical sheet 30.

Figure 8:
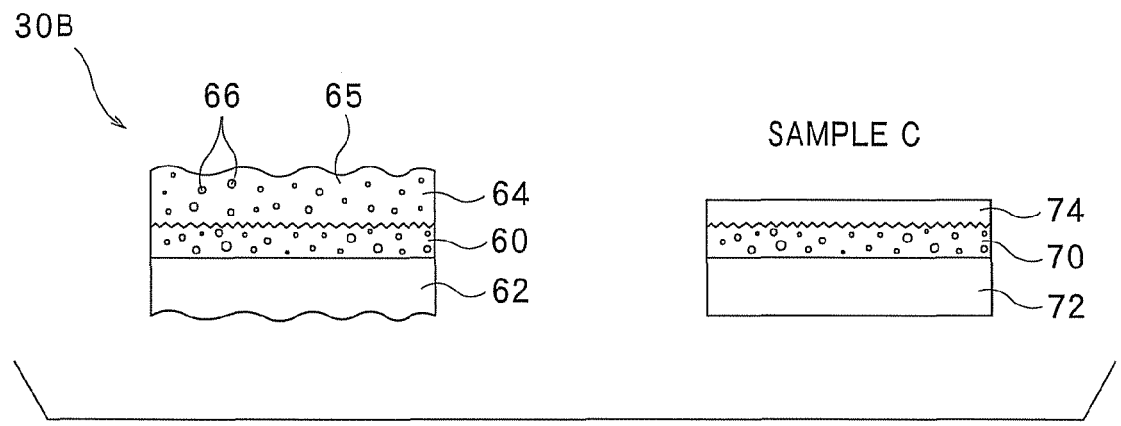
FIG. 8 is a diagram illustrating a sample to be measured an internal diffusion value.

For example, the internal diffusion value of the light diffusing layer 40 in the optical sheet 30B shown in FIG. 8 may be determined by producing the following sample C, and measuring the haze value of the sample C. The optical sheet 30B is composed of a light diffusing layer 60, a light incident side layer 62 adjacent, from the light incident side, to the light diffusing layer 60, and a light outgoing side layer 64 adjacent, from the light outgoing side, to the light diffusing layer 60. The light outgoing side layer 64 comprises a binder resin portion 65 and light diffusing particles 66 dispersed in the binder resin portion 65. On the other hand, the sample C is composed of a central layer 70, a first adjacent layer 72 adjacent to one side of the central layer 70, and a second adjacent layer 74 adjacent to the other side of the central layer 70. The central layer 70 has the same construction as the light diffusing layer 60 of the optical sheet 30B. The first adjacent layer 72 is made of the same material as the light incident side layer 62. The first adjacent layer 72 has a smooth surface, extending parallel to the sheet surface of the sample C, on the side opposite to the side facing the central layer 70. The second adjacent layer 74 is made of the same material as the light outgoing side layer 64, i.e. the same binder resin. The second adjacent layer 74 has a smooth surface, extending parallel to the sheet surface of the sample C, on the side opposite to the side facing the central layer 70.

The internal diffusion value of a light diffusing layer 40 is as described above. The internal transmittance of a light diffusing layer 40 will now be described.

The internal transmittance of a light diffusing layer 40 in an optical sheet 30 relates to the degree of the proportion of light transmitted through the light diffusing layer 40 as incorporated in the optical sheet 30. In particular, the internal transmittance represents the degree of the proportion of light transmitted through the interface between the light diffusing layer 40 and a layer adjacent, from the light incident side, to the light diffusing layer 40, through the light diffusing layer 40, and through the interface between the light diffusing layer 40 and a layer adjacent, from the light outgoing side, to the light diffusing layer 40. In other words, the internal transmittance represents the degree of the proportion of light transmitted through the light diffusing layer 40, determined in consideration of the diffusion of light at the interface between the light diffusing layer 40 and a layer adjacent to the light incident side of the light diffusing layer 40, the diffusion of light within the light diffusing layer 40, and the diffusion of light at the interface between the light diffusing layer 40 and a layer adjacent to the light outgoing side of the light diffusing layer 40.

An image definition value, measured by using four types of optical combs in accordance with JIS K7105, is used as an index of the proportion of transmitted light. More specifically, an image definition value measured by using an optical comb in accordance with JIS K7105, which is indicative of the degree of the proportion of light transmitted through the light diffusing layer 40 as incorporated in the optical sheet 30, is herein called an internal image definition of the light diffusing layer 40. The internal transmittance of the light diffusing layer 40 in the optical sheet 30 can be determined by the sum of an internal image definition of the light diffusing layer 40 measured by using a 0.125-mm optical comb, an internal image definition of the light diffusing layer 40 measured by using a 0.5-mm optical comb, an internal image definition of the light diffusing layer 40 measured by using a 1.0-mm optical comb, and an internal image definition of the light diffusing layer 40 measured by using a 2.0-mm optical comb.

A sample, having the same construction as one of the above-described samples for use in the measurement of internal diffusion value, may be used in the measurement of image definition in accordance with JIS K7105. Any of the above-described samples for use in the measurement of internal diffusion value can exert on incident light the same light diffusing effect as the light diffusing effect exerted on light entering the corresponding optical sheet 30 at the interface between the light diffusing layer 40 and a layer adjacent, from the light incident side, to the light diffusing layer 40, within the light diffusing layer 40, and at the interface between the light diffusing layer 40 and a layer adjacent, from the light outgoing side, to the light diffusing layer 40. The respective internal image definitions of the light diffusing layer 40 can therefore be determined by measuring image definition values for such a sample using the four optical combs in accordance with JIS K7105. The internal transmittance of the light diffusing layer 40 in the optical sheet 30 can then be determined by summing the four internal image definition values.

An exemplary method for the production of the optical sheet 30 having the above-described construction will now be described.

First, a film which is to constitute the base layer 32 is prepared. The film preferably has high optical transparency. Examples of usable films include a film of a polyester resin, such as polyethylene terephthalate, polyethylene naphthalate, etc., and a film of a polyolefin resin, such as polypropylene, polycycloolefin, etc. A biaxially-oriented film is generally used as the base layer 32. The thickness of the film of the base layer 32 is generally in the range of 20 to 200 µm.

Next, a fluid resin, which is to make the binder resin portion 42 of the light diffusing layer 40, is coated onto the film. Various coating methods, such as spin coating and die coating, can be used for the coating. The fluid resin to be coated onto the film contains light diffusing particles 45. Examples of the fluid resin include a thermosetting resin such as a two-component curable urethane resin comprising a polyol compound and an isocyanate compound, an epoxy resin, etc. and a thermoplastic resin such as a vinyl chloride-vinyl acetate copolymer, an acrylic resin, etc. In the case of a resin whose fluidity is insufficient for coating, a solvent is mixed with the resin to dissolve or disperse the resin in it. Examples of usable solvents include a ketone solvent such as methyl ethyl ketone, an ester solvent such as ethyl acetate, an aromatic hydrocarbon solvent such as toluene, an aliphatic hydrocarbon solvent such as hexane, an alcohol solvent such as ethyl alcohol, and water. Particles having an average particle size of about 0.5 to 100 µm, made of a transparent material such as silica (silicon dioxide), alumina (aluminum oxide), an acrylic resin or a polycarbonate resin, may be used as the light diffusing particles 45 (which are to exist solely as aggregates 47 or as a mixture of aggregates 47 and single particles 46). The shape of a single particle may be spherical, spheroidal, polyhedral, truncated polyhedral, scale-like, or acicular. In order to adjust dispersibility of the single particles 46 in the binder resin, aggregability of the single particles 46, the strength of the coating film (light diffusing layer 40), etc., the single particles 46 may be subjected to surface treatment, such as a treatment for coating with a silane coupling agent, a treatment to provide a functional group such as an acryloyl group, a methacryloyl group, a hydroxyl group or an isocyanate group, a corona discharge treatment, etc.

Thereafter, the liquid resin (coating liquid) applied to the film is solidified e.g. by solvent drying or by curing e.g. through a chemical reaction. The degree of aggregation of the light diffusing particles 45 in the resin can be controlled by adjusting the drying rate or the curing rate. The rate adjustment can also adjust the above-described internal diffusion value and internal transmittance of the light diffusing layer 40 in the optical sheet 30.

In this step, the resin is heated to evaporate a solvent and/or promote the curing reaction of the resin which is a thermosetting resin. The degree of aggregation of the light diffusing particles 45 can also be controlled by adjusting the heating temperature. The drying or curing rate is adjusted in consideration of affinity (compatibility) between the resin, which is to make the binder resin portion 42, and the light diffusing particles 45. For example, when the affinity between the resin and the light diffusing particles 45 is poor, the light diffusing particles 45 have a high tendency to aggregate in the resin. In this case, the aggregation can be suppressed by using a high drying or curing rate, whereas the aggregation can be promoted by using a low drying or curing rate.

In the light diffusing layer 40 thus produced, the surface on the side opposite to the side facing the film (base layer 32) can be made a rough surface, having a desired level of irregularities, by appropriately adjusting the weight ratio between the light diffusing particles 45 and the binder resin portion 42, the average particle size of the light diffusing particles 45, etc., in advance. Further, the configuration of irregularities in the light outgoing side rough surface of the light diffusing layer 40 can be adjusted also by adjusting production conditions for the light control layer 35 to be produced after the production of the light diffusing layer 40, as will be described later. Owing to the configuration of irregularities in the light outgoing side rough surface of the light diffusing layer 40, the optical sheet 30 can perform a desired useful optical function.

Next, a fluid resin is applied onto the light diffusing layer 40 and shaped into the light control layer 35. An ultraviolet (UV) curable resin or an electron beam (EB) curable resin, e.g. comprising an acrylate, methacrylate or epoxy monomer or prepolymer, or a mixture thereof, can be used as a material for the light control layer 35.

The optical sheet 30 can be produced in the above-described manner.

In view of the productivity of the optical sheet, the light control layer 35 is preferably formed by using an ionizing radiation curable resin which can be cured in a short time. The binder resin portion 42 of the light diffusing layer 40 adjacent to the light control layer 35 is preferably formed from a material which can respond to rapid polymerization shrinkage of an ionizing radiation curable resin which is to make the light control layer 35. It has been found through the present inventors' studies that a thermosetting resin is suited as a material which is to make the binder resin portion 42 of the light diffusing layer 40 adjacent to the light control layer 35. When the binder resin portion 42 is formed with the use of a thermosetting resin, the binder resin portion 42 can be heated and cured after curing an ionizing radiation curable resin which is to make the light control layer 35. This method can prevent deformation of the material which is to make the binder resin portion 42 of the light diffusing layer 40 adjacent to the light control layer 35 upon polymerization shrinkage of the material which is to make the light control layer 35, thereby preventing the occurrence of deformation, such as cracking or warping, of the optical sheet 30. Furthermore, by curing the binder resin portion 42 after polymerization shrinkage of the material which is to make the light control layer 35, a certain degree of rigidity can be imparted to the optical sheet 30.

An optical sheet 30 was actually produced by curing an ionizing radiation curable resin so as to form a light control layer 35, and then heating and curing a thermosetting resin so as to form a binder resin portion 42. There was only a slight or no deformation (such as warping) observed in the optical sheet 30 produced and, in addition, the optical sheet 30 was found to have an intended strength. On the other hand, however, when the optical sheet 30 was subjected to a heat endurance test, cracking occurred frequently in the light control layer 35. The cracking occurred especially in thin portions of the light control layer 35. For example, in the case of a linear array of triangular prisms as shown in FIG. 2, the cracking occurred mainly in the valley portions along the valley line.

Based on various experiments, the present inventors have found the following effective parameters to prevent the occurrence of cracking in a heat endurance test. The various experiments are partly described in the Examples below.

First, a difference in expansion coefficient between the light control layer 35 and the light diffusing layer 40 is considered to be a factor for the occurrence of cracking in a heat endurance test. When the light control layer 35 is made of an ionizing radiation curable resin and the binder resin portion 42 of the light diffusing layer 40 is made of a thermosetting resin, the ratio of the linear expansion coefficient of the material of the binder resin portion 42 of the light diffusing layer 40 relative to the linear expansion coefficient of the material of the light control layer 35 is generally more than 100%. It has been found, based on experiments conducted by the present inventors, that the occurrence of cracking can be prevented when the ratio of the linear expansion coefficient of the material of the binder resin portion 42 of the light diffusing layer 40 relative to the linear expansion coefficient of the material of the light control layer 35 is not more than 1500%, preferably not more than 1200%. The linear expansion coefficient is determined by the following method in which a test sample is heated from 20° C. to 80° C.

The "linear (thermal) expansion coefficient" herein refers to the one specified by JIS K-7197. In the measurement of linear expansion coefficient, the temperature of a test specimen before heating is herein set at 20° C. and the temperature of the test specimen after heating is set at 80° C. The temperature of a test specimen before heating is set at 20° C. because of the following reasons: the temperature is near room temperature at which an optical sheet is usually used; and a thermosetting resin or an ionizing radiation curable resin, which is used in an optical sheet for a common display device, will not thermally expand at a temperature below 20° C. to such an extent as to affect cracking. The temperature of the test specimen after heating is set at 80° C. because of the following reasons: the temperature is higher than an expected maximum temperature to which a common display device could be exposed; and the maximum temperature in a heat endurance test for an optical sheet for a common display device is generally 80° C. The linear expansion coefficient is herein measured in accordance with JIS K-7197 on a strip-shaped test specimen. The measurement region of the test specimen may have a width of about 5 mm, a length of about 10 mm and a thickness of about 150 μm.

Most resins show glass transition, and the linear expansion coefficient of a resin considerably changes in the vicinity of its glass transition temperature. In particular, the linear expansion coefficient of a thermosetting resin greatly increases when it is heated to the glass transition temperature. It is therefore preferred that the glass transition temperature of the light diffusing layer 40 be higher than the above-described temperature 80° C. Further, the difference between the glass transition temperature $Tg1$ of the light control layer 35 and the glass transition temperature $Tg2$ of the light diffusing layer 40 is preferably not more than 40° C., more preferably not more than 30° C., so that the linear expansion coefficient of the light control layer 35 can change along with the change in the linear expansion coefficient of the light diffusing layer 40. It has been confirmed that in this case, i.e. in the case where the following formula holds true, the occurrence of cracking in the optical sheet 30 can be effectively prevented in a heat endurance test in which the optical sheet 30 is heated to 80° C.:

$$|Tg1-Tg2| \leq 30° C.$$

The resin material of the light diffusing layer 40 preferably has a strong intermolecular bond. It has been found through the present inventors' studies that when the resin material of the light diffusing layer 40 is considered to have a strong intermolecular bond, the above-described linear expansion coefficient ratio is likely to fall within the above-described preferable range for preventing the occurrence of cracking in the optical sheet 30, and the occurrence of cracking in the optical sheet 30 in a heat endurance test can be suppressed. It is conceivable that the strong intermolecular bond hardens the light diffusing layer 40.

In particular, it has been found that when the binder resin portion 42 of the light diffusing layer 40 is considered to have many urethane bonds, the occurrence of cracking in the optical sheet 30 can be effectively prevented in a heat endurance test in which the optical sheet 30 is heated to 80° C. It is especially preferred that the main material which is to make the binder resin portion 42 have urethane bonds. It has been found that when main material which is to make the binder resin portion 42 have urethane bonds, the occurrence of cracking in the optical sheet 30 can be effectively prevented in a heat endurance test in which the optical sheet 30 is heated to 80° C., as compared to the case where the binder resin portion 42 comes to have urethane bonds as a result of reaction, e.g. the case where the binder resin portion 42 comes to have urethane bonds through crosslinking of main materials having ester bonds with an isocyanate.

It has also been found that when the binder resin portion 42 of the light diffusing layer 40 is considered to come to contain many hydrogen bonds, the occurrence of cracking in the optical sheet 30 can be effectively prevented in a heat endurance test in which the optical sheet 30 is heated to 80° C. When the main material which is to make the binder resin portion 42 has a high hydroxyl value, the binder resin portion 42 is generally considered to come to have many hydrogen bonds. It has been confirmed that when the main material which is to make the binder resin portion 42 has a high hydroxyl value of not less than 6, the occurrence of cracking in the optical sheet 30 can be effectively prevented in a heat endurance test in which the optical sheet 30 is heated to 80° C.

The operations of the optical sheet 30, the surface light source device 20 and the transmission type display device 10 will now be described.

The overall operation of the transmission type display device 10 and the surface light source device 20 will be described first.

Referring to FIG. 1, light emitted by the light source 22 enters the light guide plate 26, and travels in the light guide plate 26 while repeating total reflection. As described above, the thickness of the light guide plate 26 decreases with distance from the light source 22. Accordingly, the light, traveling in the guide plate 26 while repeating total reflection, travels away from the light source 22. The incident angle with respect to the surface of the light guide plate 26 gradually decreases as the light repeats total reflection. Consequently, the light comes to enter the surface of the light guide plate 26 at an incident angle which is less than the critical angle for total reflection, and thus can exit the light guide plate 26.

White dot patterns 27 are formed on the back surface of the light guide plate 26. When light traveling in the light guide plate 26 enters the white dot patterns 27, the light is diffused. The proportion of the area of the white dot pattern 27 in the back surface of the light guide plate 27 gradually increases with distance from the light source 22. Accordingly, light traveling in the light guide plate 22 is more likely to be reflected and diffused by the white dot patterns 27 as the light travels away from the light source 22. Once light in the light guide plate 22 is reflected and diffused by the white dot patterns 27, the light is then likely to travel toward and enter the surface of the light guide plate 26 at an incident angle which is less than the critical angle for total reflection, and thus can exit the light guide plate 26.

The amount of light that exits the observer side surface of the light guide plate 26 is therefore approximately constant regardless of distance from the light source 22. Thus, the in-plane distribution of luminance in the observer side surface of the light guide plate 26 is approximately uniform.

Light that has exited the back surface of the light guide plate 26 is reflected by a reflective plate 24 and then travels toward the observer side.

Light that has exited the light guide plate 26 enters the light diffusing sheet 28, where the light is isotropically diffused. Thereafter, the light enters the optical sheet 30 and is further diffused in the light diffusing layer 40.

Lights L31, L32, L33 that exit the unit shaped elements 38 are refracted at the light outgoing side surface (prism surface) of the unit shaped elements (unit optical elements, unit prisms) 38, as shown in FIG. 3. Due to the refraction, the lights L31, L32, L33, traveling in a direction inclined from the front direction nd, are bent such that the angle of the travel direction (exit direction) of each light with respect to the normal direction nd of the sheet surface of the optical sheet 30 becomes smaller. Such an action of the unit shaped elements 38 can condense (collect) transmitted light in the front direction nd. The unit shaped elements 38 thus exert a light condensing effect (light collecting effect) on transmitted light. For easier understanding of the light condensing effect, a depiction of the light diffusing layer 40 and a depiction of diffusion of the transmitted lights L31, L32, L33 in the light diffusing layer 40 have been omitted from FIG. 3.

Light that has exited the optical sheet 30 enters the transmission type display unit 15. The transmission type display unit 15 transmits the light from the surface light source device 20 selectively for each pixel, whereby a viewer of the transmission type display device 10 can view images.

When the optical sheet 30 is superimposed on another member to construct the surface light source device 20 and the transmission type display device 10, a fringe like pattern (fringe pattern) may appear in a region where the unit shaped elements 38 of the optical sheet 30 are in contact with the member, as described above. The fringe like pattern will degrade the image quality. The problem tends to be marked when the unit shaped elements 38 of the optical sheet 30 make contact with the smooth light incident side surface 13a (which is usually the surface of a polarizing plate, but sometimes is the surface of a retardation film, a polarization separation film, a protective film, etc.).

It is generally conceivable that a fringe like pattern (interference pattern, moire) may be produced due to the arrangement pitch of the pixels of the transmission type display unit 15 and the arrangement pitch of the unit shaped elements 38 of the optical sheet 30. A known effective method to obscure the fringe like pattern is to set the ratio between the arrangement pitch of the pixels and the arrangement pitch of the unit shaped elements 38 within a predetermined range. It is also known that the provision of a layer having a high light diffusing function can obscure such a fringe like pattern. However, the provision of a layer having a high light diffusing function will cause problems, such as a lowering of the transmittance of light emitted by the light source.

However, it has been found through the present inventors' studies that a fringe like pattern, which is produced due to contact of the unit shaped elements of an optical sheet with the smooth light incident side surface 13a of the transmission type display device 15, cannot be obscured merely by adjusting the arrangement pitch of the pixels of the transmission type display unit 15 and the arrangement pitch of the unit shaped elements of the optical sheet. Further, a fringe like pattern cannot be effectively obscured by roughening the light incident side surface of an optical sheet (see the Examples described below). Instead, when the light incident side surface of the optical sheet having the construction shown in FIG. 1 is roughened to such an extent to obscure the fringe like pattern the transmittance light emitted by the light source is significantly lowered and the image quality is considerably degraded.

On the other hand, according to an optical sheet 30 having, as an internal layer (layer other than the outermost light incident side layer and the outermost light outgoing side layer), the light diffusing layer 40 containing light diffusing particles 45 as single particles 46 and aggregates (agglomerates, composite particles, secondary particles) 47, a fringe like pattern can be effectively obscured as supported by the evaluation results in the Examples described below. Although the mechanism by which a fringe like pattern can be obscured is not fully clear, a conceivable mechanism will be described with reference mainly to FIGS. 4 and 16. The present invention, however, is not bound by the following mechanism.

Figure 16:
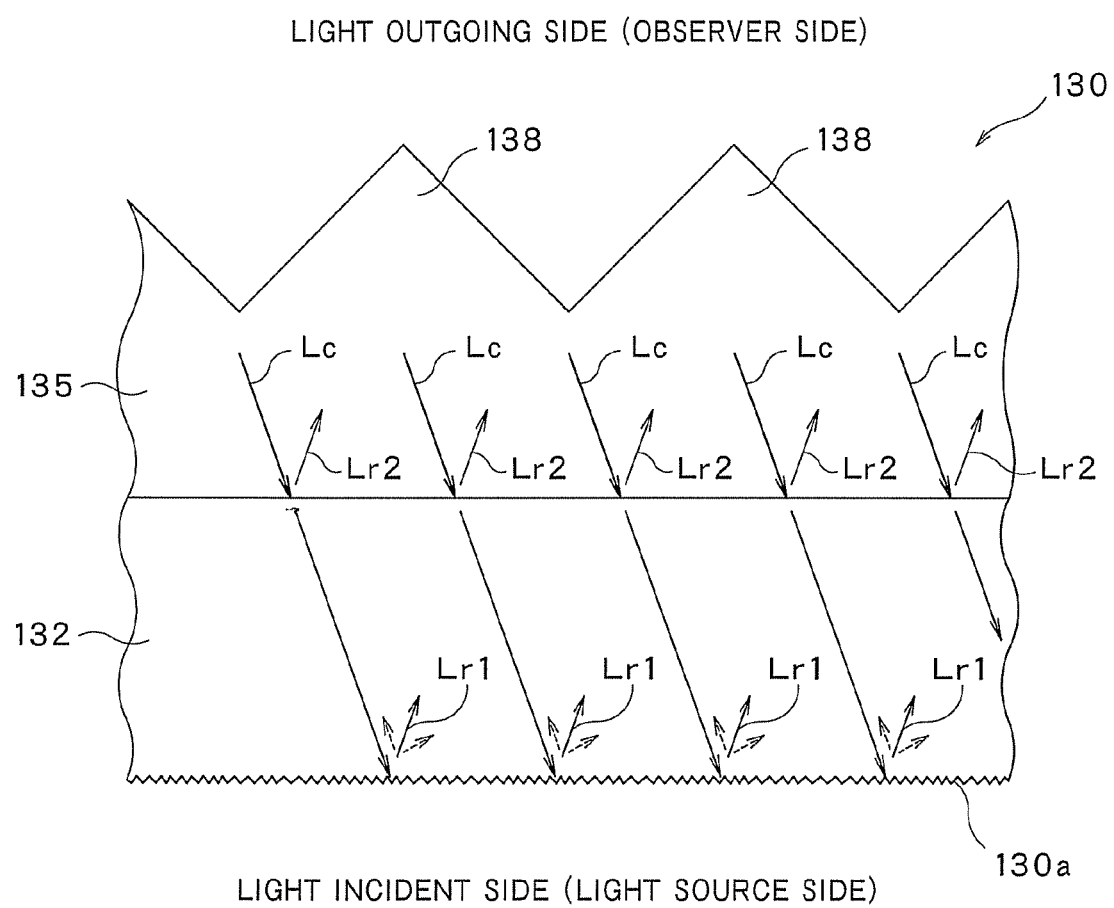
FIG. 16 is a diagram corresponding to FIG. 4, for explaining the mechanism of the formation of a fringe like pattern.

Image light, which is to be viewed by a viewer, exits from the display device 10. On the other hand, there also exists light that enters the display device 10 from the observer side. Such light includes environmental light (external light), such as sunlight, indoor lamplight, etc. As shown in FIGS. 4 and 16, part of environmental light Lc is transmitted through the transmission type display unit 15 and enters the optical sheet 30 adjacent to the transmission type display unit 15. Because such environmental light Lc has been transmitted through the pixel region in the transmission type display unit 15, the light has intensity variation corresponding to the arrangement pitch of pixels along a direction parallel to the sheet surface of the optical sheet 30. Thus, the environmental light Lc enters the optical sheet 30 as light having a periodic intensity variation.

Especially when the unit shaped elements 38 of the optical sheet 30 are in contact with the light incident side surface of the transmission type display unit 15, the environmental light Lc directly passes through the contact portions. Consequently, it is presumed that the absolute amount of environmental light Lc that enters the optical sheet 30 increases. In this case, the environmental light Lc that has entered the optical sheet 30 is considered to have a strong periodicity corresponding to the arrangement pitch of the pixels and to the arrangement pitch of the unit shaped elements 38.

As shown in FIG. 16, most of environmental light Lc that has entered an optical sheet 130 is reflected in the sheet 130 and the travel direction is reversed, and the light then travels toward the observer side. In particular, most of the environmental light Lc is considered to be reflected at the interface between the light incident side surface 130a of the optical sheet 130 and the atmosphere while maintaining its periodicity. However, when the light incident side surface 130a of the optical sheet 130 is an uneven surface, the periodicity of the reflected light Lr1 is somewhat weakened by light diffusion at the light incident side surface 130a as shown in FIG. 16.

Further, a light control layer 135 containing unit shaped elements (unit prisms) 138 is generally formed by molding on a base layer 132. Therefore, an optical interface is formed between the light control layer 135 and the base layer 132. It is possible that the environmental light Lc may be reflected also at the optical interface as shown in FIG. 16. Because the interface between the light control layer 135 and the base layer 132 is usually a smooth surface, the reflected light Lr2 from this interface travels toward the observer side while maintaining the periodicity.

The reflected lights Lr1, Lr2 of environmental light Lc, having periodicity, thus travel toward the transmission type display unit 15. Consequently, four reflected lights, i.e. the reflected lights Lr1, Lr2 which maintain sufficient coherence and, though not depicted, reflected light from the surface of the unit shaped elements 138 and reflected light from the light incident side surface 13a of the transmission type display unit, form an interference pattern. It is conceivable that a visible fringe like pattern is formed by the interference pattern in combination with interference between the periodic intensity variation of the reflected lights Lr1, Lr2 and the periodic pixel pitch of the transmission type display unit 15. It is also conceivable that especially when the unit shaped elements 138 of the optical sheet 130 are in contact with the smooth light incident side surface 13a of the transmission type display unit 15, the periodicity of the reflected lights Lr1, Lr2 is stronger and the amount of the reflected lights Lr1, Lr2 is larger, and therefore the fringe like pattern is clearer.

On the other hand, the above-described optical sheet 30 of this embodiment has the light diffusing layer 40 as an internal layer (between the light incident side surface and the light outgoing side surface). The light diffusing layer 40 at least contains aggregates 47 of aggregated single particles 46 of light diffusing particles 45. The light outgoing side surface of the light diffusing layer 40, forming the interface with the light control layer 35, is designed as a rough surface having a light diffusing ability. The light diffusing layer 40 has moderate light diffusing ability and light transmitting ability.

As shown in FIG. 4, most of environmental light Lc, traveling through the light control layer 35 toward the light diffusing layer 40, enters the light diffusing layer 40 and transmitted through the light diffusing layer 40. The environmental light Lc that has entered the light diffusing layer 40 is diffused at the interface between the light control layer 35 and the light diffusing layer 40 and in the light diffusing layer 40, whereby the periodicity of the environmental light Lc is weakened. Most of such environmental light enters the base layer 32, and is reflected at the light incident side surface of the optical sheet 30 and travels toward the observer side. In this embodiment the light incident side surface of the optical sheet 30 is a smooth surface, and therefore the light is regularly reflected (specularly reflected) at the surface. Thereafter, the reflected light L1 is again transmitted through the light diffusing layer 40 and again diffused in the light diffusing layer 40 and at the interface between the light control layer 35 and the light diffusing layer 40. Thus, the reflected light L1, which is presumed to account for a large proportion of the environmental light Lc, is diffused twice in the light diffusing layer 40 whereby the periodicity and the coherence are considerably weakened.

As shown in FIG. 4, part of the environmental light Lc traveling in the light diffusing layer 40 is reflected at the interface between the light diffusing layer 40 and the base layer 32, and travels toward the observer side. The reflection at the interface between the light diffusing layer 40 and the base layer 32 is a generally regular reflection (specular reflection). The reflected light L2 is again transmitted through the light diffusing layer 40 and again diffused in the light diffusing layer 40 and at the interface between the light control layer 35 and the light diffusing layer 40. Thus, the reflected light L2, part of the environmental light Lc, is diffused twice in the light diffusing layer 40 whereby the periodicity is considerably weakened.

Further, as shown in FIG. 4, the environmental light Lc, traveling through the light control layer 35 toward the light diffusing layer 40, partly includes light L3 which is reflected at the interface between the light control layer 35 and the light diffusing layer 40. Because the reflection at the interface between the light control layer 35 and the light diffusing layer 40 is diffuse reflection, the periodicity and the coherence of the reflected light L3 are considerably weakened.

As described above, the environmental light Lc, which has been transmitted through the transmission type display unit 15 and entered the optical sheet 30, is effectively diffused in the optical sheet 30. Consequently, the coherence of reflected lights, i.e. the reflected lights L1, L2, L3 which re-enter the transmission type display unit 15 and, though not depicted, reflected light from the surface of the unit shaped elements and reflected light from the light incident side surface 13a of the transmission type display unit 15, is weakened. In addition, the periodicity of the intensity variation of each of the lights L1, L2, L3 is considered to be weakened. It is conceivable, therefore, that a fringe like pattern can be effectively obscured according to the optical sheet 30 of this embodiment.

It has been found through the present inventors' studies that a fringe like pattern can be very effectively obscured when the internal diffusion value of the light diffusing layer 40, which indicates the degree of light diffusion by the light diffusing layer 40 in the optical sheet 30 and which is expressed in terms of a haze value, is not less than 20, preferably not less than 35, as demonstrated by the evaluation results in the below-described Examples.

Further, as demonstrated by the evaluation results in the below-described Examples, a fringe like pattern can be very effectively obscured when the internal transmittance of the light diffusing layer 30, which indicates the degree of light transmission by the light diffusing layer 40 in the optical sheet 30 and which is expressed in terms of the sum of image definition values respectively measured by using a 0.125-mm optical comb, a 0.5-mm optical comb, a 1.0-mm optical comb and a 2.0-mm optical comb, is not more than 350, preferably not more than 230.

In the above-described optical sheet 130 shown in FIG. 16, the reflected light Lr2 will not be diffused. Thus, the reflected light Lr2 travels toward the observer side and enters the transmission type display unit 15 while maintaining the periodicity. Though the reflected light Lr1 has been diffused at the light incident side surface of the optical sheet 130, having a light diffusing function, the reflected light will not be diffused again. Thus, according to the optical sheet 30 of this embodiment, the formation of a fringe like pattern can be very effectively prevented as compared to the optical sheet 130 shown in FIG. 16.

Light from the light source, which becomes image light, is diffused when it passes through the light diffusing layer 40. However, unlike the environmental light Lc, the source light is not diffused twice. Therefore, the source light can be prevented from being diffused excessively by the light diffusing function of the light diffusing layer 40 and the front direction luminance can be effectively enhanced by the light condensing function of the light control layer 35. In addition, because of no excessive diffusion of the light from the light source, by the light diffusing layer 40, the optical sheet 30 can maintain a proper degree of transmittance and can enjoy various advantages (e.g. enhanced luminance, efficient use of energy). That is to say, according to this embodiment, a fringe like pattern (interference pattern) can be obscured without significant degradation of image quality.

It has been found through the present inventors' studies that a sufficient luminance can be secured when the internal diffusion value of the light diffusing layer 40 in the optical sheet 30 is not more than 70 or when the internal transmittance of the light diffusing layer 40 in the optical sheet 30 is not less than 70.

According to this embodiment, the optical sheet 30 has the internal light diffusing layer 40 containing aggregates (agglomerates, composite particles, secondary particles) 47 of single light diffusing particles 46. Such aggregates 47, compared to single particles 46, are considered to exert a diffusing effect on light (light rays or beams), which would form the problematic fringe like pattern, in such a manner as to effectively reduce the periodic modulation of the coherence and intensity. The light diffusing layer 40, therefore, can effectively prevent a problem, in particular the formation of a fringe like pattern, which can arise when the optical sheet 30 is superimposed on another member.

Furthermore, the following facts have been found through the present inventors' studies of the light diffusing sheet 40. As described above, when the surface, on the side of the light control layer 35, of the light diffusing layer 40 is designed as a rough surface having raised portions 48 (see FIGS. 9 and 10), the rough surface can effectively prevent the problem which can arise when the optical sheet 30 is superimposed on another member. It has been found that the rough surface, on the side of the light control layer 35, of the light diffusing layer 40, depending on the configuration of the raised portions 48 of the rough surface, can impart an additional optical function to the optical sheet 30. In particular, it has been found that the optical function of the optical sheet 30 can be effectively adjusted by changing the average value of the radii of curvature (average curvature radius) at the tops of the raised portions 48 of the light outgoing side surface of the light diffusing layer 40 relative to the average value of the radii of granulated substances (average curvature radius) consisting of light diffusing particles in the light diffusing layer 40.

Figure 9:
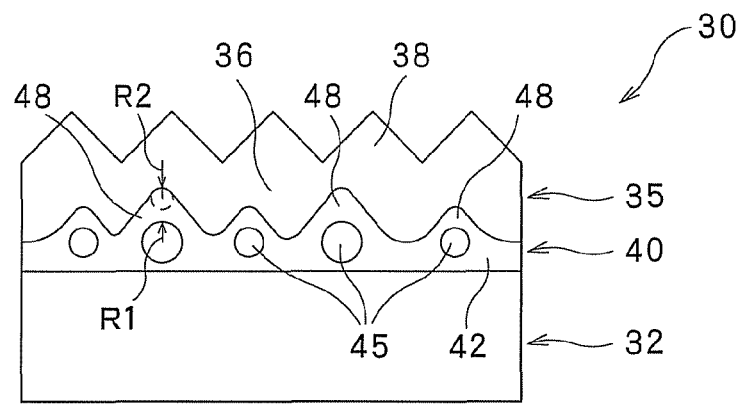
FIG. 9 is a cross-sectional view of an optical sheet in the main cross-section, for explaining an example of the light outgoing side surface of a light diffusing layer.
Figure 10:
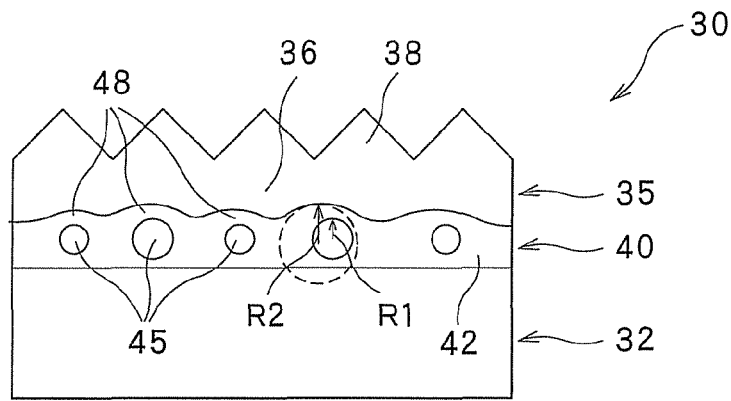
FIG. 10 is a cross-sectional view of an optical sheet in the main cross-section, for explaining another example of the light outgoing side surface of a light diffusing layer.

The "granulated substances consisting of light diffusing particles" herein refers to granulated substances 45 which are dispersed in the light diffusing layer 40 and each of which is either an aggregate 47 of light diffusing single particles or a light diffusing single particle 46, as described above with reference to FIGS. 5A through 5C. The radius of a granulated substance 45 which is an aggregate 47 of light diffusing single particles is approximately defined by the radius of the circumscribing sphere of the aggregate 47. The radius of a granulated substance 45 which is a non-spherical light diffusing single particle 46 is approximately defined by the radius of the circumscribing sphere of the light diffusing single particle 46. In practice, the average value of the radii R1 of the granulated substances 45 can be determined by observing a cross section of the optical sheet 30 with an optical microscope or an electron microscope to measure the radii of 3 to 50 (preferably at least 20) granulated substances 45, and averaging the measured values. Similarly, the average value of the radii R2 of curvature at the tops of the raised portions 48 of the rough light outgoing side surface of the light diffusing layer 40 of the optical sheet 30 can be determined by observing a cross section of the optical sheet 30 with an optical microscope or an electron microscope to measure the radii R2 of curvature at the tops of 3 to 50 (preferably at least 20) raised portions 48, and averaging the measured values. As shown in FIGS. 9 and 10, in this embodiment the raised portions 48 are formed such that each raised portion corresponds to one granulated substance 45 in the light diffusing layer 40, with the top of the raised portion lying at a slightly different position from the granulated substance 45 in the normal direction nd of the optical sheet 30.

In the optical sheet 30 having the above-described construction, the average value of the radii R2 of curvature at the tops of the raised portions 48 of the light outgoing side surface of the light diffusing layer 40 can be controlled relative to the average value of the radii R1 of the light diffusing particles 45 in the light diffusing layer 40 e.g. in the following manner: The radii R2 of curvature at the tops of the raised portions 48 can be adjusted by adjusting the processing pressure (nip pressure) when molding the light control layer 35 of an ionizing radiation curable resin on the light diffusing layer 40, consisting of the binder resin portion 42 and the light diffusing particles 45, before positively heating and curing. When a mold in which the ionizing radiation curable resin is housed is pressed against the base layer 32 and the light diffusing layer 40 at a high pressure (when the processing pressure upon molding is high), the average value of the radii R2 of curvature at the tops of the raised portions 48 is likely to be higher than the average value of the radii R1 of the granulated substances 45 in the light diffusing layer 40. On the other hand, when the mold is pressed against the base layer 32 and the light diffusing layer 40 at a low pressure (when the processing pressure upon molding is low), the average value of the radii R2 of curvature at the tops of the raised portions 48 is likely to be lower than the average value of the radii R1 of the granulated substances 45 in the light diffusing layer 40.

The average value of the radii R2 of curvature at the tops of the raised portions 48 of the light outgoing side surface of the light diffusing layer 40 can be controlled relative to the average value of the radii R1 of the granulated substances 45 in the light diffusing layer 40 also by adjusting the degree of cure shrinkage of the ionizing radiation curable resin. When the cure shrinkage is small, the average value of the radii R2 of curvature at the tops of the raised portions 48 is likely to be higher than the average value of the radii R1 of the granulated substances 45 in the light diffusing layer 40. On the other hand, when the cure shrinkage is large, the average value of the radii R2 of curvature at the tops of the raised portions 48 is likely to be lower than the average value of the radii R1 of the granulated substances 45 in the light diffusing layer 40. The degree of cure shrinkage of the ionizing radiation curable resin can be changed by adjusting the composition of the ionizing radiation curable resin. For example, the degree of cure shrinkage can generally be increased by increasing the number of functional groups (acryloyl groups, methacryloyl groups, etc.) per monomer or prepolymer molecule in the ionizing radiation curable resin.

The average value of the radii R2 of curvature at the tops of the raised portions 48 of the light outgoing side surface of the light diffusing layer 40 can be controlled relative to the average value of the radii R1 of the light diffusing particles 45 in the light diffusing layer 40 also by adjusting the viscosity (fluidity) of a resin material to be coated onto the base resin layer 32 and to make the binder resin portion 42 of the light diffusing layer 40. When the resin material has a low viscosity (high fluidity), the average value of the radii R2 of curvature at the tops of the raised portions 48 is likely to be higher than the average value of the radii R1 of the granulated substances 45 in the light diffusing layer 40. On the other hand, when the resin material has a high viscosity (low fluidity), the average value of the radii R2 of curvature at the tops of the raised portions 48 is likely to be lower than the average value of the radii R1 of the granulated substances 45 in the light diffusing layer 40.

It has been found through the present inventors' experiments that when the average value of the radii R2 of curvature at the tops of the raised portions 48 is made lower than the average value of the radii R1 of the granulated substances 45 in the light diffusing layer 40 as shown in FIG. 9, the front direction luminance of the surface light source device 20 can be enhanced. Thus, an excellent light condensing function can be imparted to the optical sheet 30 by making the average value of the radii R2 of curvature at the tops of the raised portions 48 lower than the average value of the radii R1 of the granulated substances 45 in the light diffusing layer 40. Instead, however, the light diffusing function of the optical sheet is lowered. On the other hand, when the average value of the radii R2 of curvature at the tops of the raised portions 48 is made higher than the average value of the radii R1 of the granulated substances 45 in the light diffusing layer 40 as shown in FIG. 10, the in-plane distribution of the luminance of the surface light source device 20 can be made more uniform. Consequently, a light source image can be more obscured in a direct-type surface light source device. Further, when the average value of the radii R2 of curvature at the tops of the raised portions 48 is made higher than the average value of the radii R1 of the granulated substances 45 in the light diffusing layer 40 as shown in FIG. 10, the viewing angle of the display device 15 can be increased. Thus, an excellent light diffusing function can be imparted to the optical sheet 30 by making the average value of the radii R2 of curvature at the tops of the raised portions 48 higher than the average value of the radii R1 of the granulated substances 45 in the light diffusing layer 40. Instead, however, the light condensing function of the optical sheet is lowered.

Japanese Patent Laid-Open Publications Nos. 2007-34287 and H8-335044 i.e. JP2007-34287A and JP8-335044A each disclose an optical sheet having an internal light diffusing layer. These patent documents, however, contain no description as to the average value of the radii of curvature at the tops of raised portions, each corresponding to one granulated substance in the light diffusing layer, of the light outgoing side surface of the light diffusing layer is made different from the average value of the radii of granulated substances.

The JP 2007-34287 publication (JP2007-34827A) only discloses exposing part of light diffusing particles on a binder resin, i.e. providing raised portions which consist of the exposed light diffusing particles themselves and whose radii of curvature at the tops are therefore identical to the radii of curvature of the light diffusing particles (see paragraph 0042 of the JP 2007-34287 publication), or flattening the light outgoing side surface of the light diffusing layer (see paragraph 0019 of the JP 2007-34287 publication), or providing raised portions on the light diffusing layer by embossing, i.e. without relation to light diffusing particles (see paragraph 0044 of the JP 2007-34287 publication). The JP H8-335044 publication (JP8-335044A) states in paragraph 0022 that "the particle size is approximately identical to the average roughness $\Delta z_2$ of surface micro irregularities 12$a$". The JP H8-335044 publication thus merely discloses providing raised portions which consist of the exposed light diffusing particles themselves and whose radii of curvature at the tops are therefore identical to the radii of curvature of the light diffusing particles.

It has been found through the present inventors' experiments that when the average value of the radii R2 of curvature at the tops of the raised portions 48 of the rough light outgoing side surface of the light diffusing layer 40 is made lower than the average value of the radii R1 of the granulated substances 45 in the light diffusing layer 40 as shown in FIG. 9, the front direction luminance can be enhanced as compared to the case where the raised portions of the rough light outgoing side surface of a light diffusing layer consist of part of light diffusing particles having the same refractive index as that of the binder resin portion. On the other hand, when the average value of the radii R2 of curvature at the tops of the raised portions 48 of the rough light outgoing side surface of the light diffusing layer 40 is made higher than the average value of the radii R1 of the granulated substances 45 in the light diffusing layer 40 as shown in FIG. 10, the in-plane distribution of luminance on the light outgoing surface of the surface light source device 20 can be made more uniform as compared to the case where the raised portions of the rough light outgoing side surface of a light diffusing layer consist of part of light diffusing particles having the same refractive index as that of the binder resin portion. Consequently, a light source image can be more obscured in a direct-type surface light source device. Further, when the average value of the radii R2 of curvature at the tops of the raised portions 48 of the rough light outgoing side surface of the light diffusing layer 40 is made higher than the average value of the radii R1 of the granulated substances 45 in the light diffusing layer 40 as shown in FIG. 10, the viewing angle of the display device 15 can be increased as compared to the case where the raised portions of the rough light outgoing side surface of a light diffusing layer consist of part of light diffusing particles having the same refractive index as that of the binder resin portion.

It has also been found that when the average value of the radii R2 of curvature at the tops of the raised portions 48 of the rough light outgoing side surface of the light diffusing layer 40 is made different from the average value of the radii R1 of the granulated substances 45 in the light diffusing layer 40 as shown in FIGS. 9 and 10, the front direction luminance can be enhanced as compared to the case where the light outgoing side surface of the light diffusing layer is a smooth surface. In addition, the in-plane distribution of luminance can be made more uniform, a light source image can be obscured, and the viewing angle can be increased.

As described above, the average value of the radii R2 of curvature at the tops of the raised portions 48 of the rough light outgoing side surface of the light diffusing layer 40 can be adjusted relative to the average value of the radii R1 of the granulated substances 45 in the light diffusing layer 40 by suitably changing production conditions for the optical sheet 30. A desired useful optical function can therefore be imparted to the optical sheet 30 merely by changing conditions for the production of the optical sheet 30. Thus, according to this embodiment in which not only the refractive index of the light diffusing particles 45 and the refractive index of the binder resin portion 42 are modified, but also the average value of the radii R2 of curvature at the tops of the raised portions 48 of the rough light outgoing side surface of the light diffusing layer 40 is adjusted relative to the average value of the radii R1 of the granulated substances 45 in the light diffusing layer 40, the freedom of design of optical functions of the optical sheet 30 can be remarkably increased. According to this embodiment in which the average value of the radii R2 of curvature at the tops of the raised portions 48 of the rough light outgoing side surface of the light diffusing layer 40 is adjusted relative to the average value of the radii R1 of the granulated substances 45 in the light diffusing layer 40, a desired optical function can be imparted to the optical sheet very easily at a considerably low cost as compared, for example, to the case where an optical function, which is designed independent of the optical action of light diffusing particles 45, is imparted to an optical sheet by providing a separate process such as embossing (as described in paragraph 0044 of the above-cited Japanese Patent Laid-Open Publications No. 2007-34287).

Various modifications can be made to the above-described embodiment. The following are exemplary variations.

For example, though in the above-described embodiment the light incident side surface of the light diffusing layer 40 is a smooth surface, it is also possible to employ a rough surface instead. Though in the above-described embodiment the light outgoing side surface of the light diffusing layer 40 is a rough surface, it is also possible to employ a smooth surface instead.

Aggregation of at least part of the light diffusing particles 45 is not necessary for the advantageous effect achieved by making the average value of the radii R2 of curvature at the tops of the raised portions 48 of the rough light outgoing side surface of the light diffusing layer 40 different from the average value of the radii R1 of the granulated substances 45 in the light diffusing layer 40. Thus, even when all the light diffusing particles 45 exist as single particles 46 in the light diffusing layer 40, the above-described advantageous effect can be achieved by adjusting the average value of the radii R2 of curvature at the tops of the raised portions 48 of the rough light outgoing side surface of the light diffusing layer 40 relative to the average value of the radii R1 of the granulated substances 45 in the light diffusing layer 40. It is therefore possible to allow all the light diffusing particles to exist as single particles in the light diffusing layer 40, and to make the average value of the radii R2 of curvature at the tops of the raised portions 48 of the rough light outgoing side surface of the light diffusing layer 40 different from the average value of the radii R1 of the granulated substances 45 in the light diffusing layer 40.

The construction of the base layer 32, which has been described by way of example, can be arbitrarily modified. For example, though in the above-described embodiment the light incident side surface of the base layer 32 is a smooth surface, the surface may be designed as a rough surface (matte surface).

Figure 11:
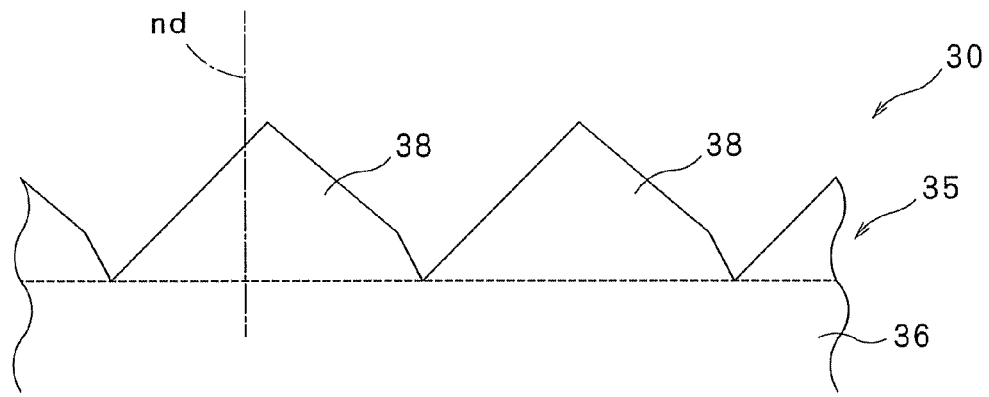
FIG. 11 is a cross-sectional view corresponding to FIG. 3, for explaining a variation of the unit shaped elements.

Further, the construction of the light control layer 35, which has been described by way of example, can be arbitrarily modified. For example, though in the above-described embodiment each unit shaped element 38 is designed as a prism having a triangular cross-sectional shape, the triangular cross-sectional shape in the main cross-section of each unit shaped element 38 may be modified or deformed e.g. so as to impart various properties to the unit shaped elements. For example, with a view to adjusting the optical function of the unit shaped elements, the cross-sectional shape in the main cross-section of each unit shaped element 38 may be a shape in which at least one side of a triangle is bent as shown in FIG. 11, a shape in which at least one side of a triangle is curved and projects (fan-like shape), a shape in which the apex of a triangle is rounded such that the center of curvature lies inside the triangle, or a shape in which micro irregularities are formed in at least one side. The cross-sectional shape of each unit shaped element 38 may be a shape other than a triangular shape, for example, a quadrangular shape such as a trapezoidal shape, or another polygonal shape such as a pentagonal or hexagonal shape. Further, the cross-sectional shape in the main cross-section of each unit shaped element 38 may be a shape corresponding to part of a circle or an ellipse.

In the above-described embodiment the unit shaped elements 38 are arranged side by side along one direction parallel to the sheet surface of the optical sheet 30, and each unit shaped element 38 is designed as a columnar prism extending linearly in another direction perpendicular to the arrangement direction (the one direction) and parallel to the sheet surface of the optical sheet 30. Thus, the arrangement of the unit shaped elements 38 in the above-described embodiment is a so-called linear array. The present invention, however, is not limited to such unit shaped elements. For example, it is possible to use a fly's eye lens composed of unit shaped elements 38, e.g. having a hemispherical or hemispheroidal shape, or a polygonal pyramid shape (including a so-called cube corner) such as a triangular or quadrangular pyramid, arranged in two different directions both parallel to the sheet surface of the optical sheet 30, i.e. arranged two-dimensionally.

Figure 12:
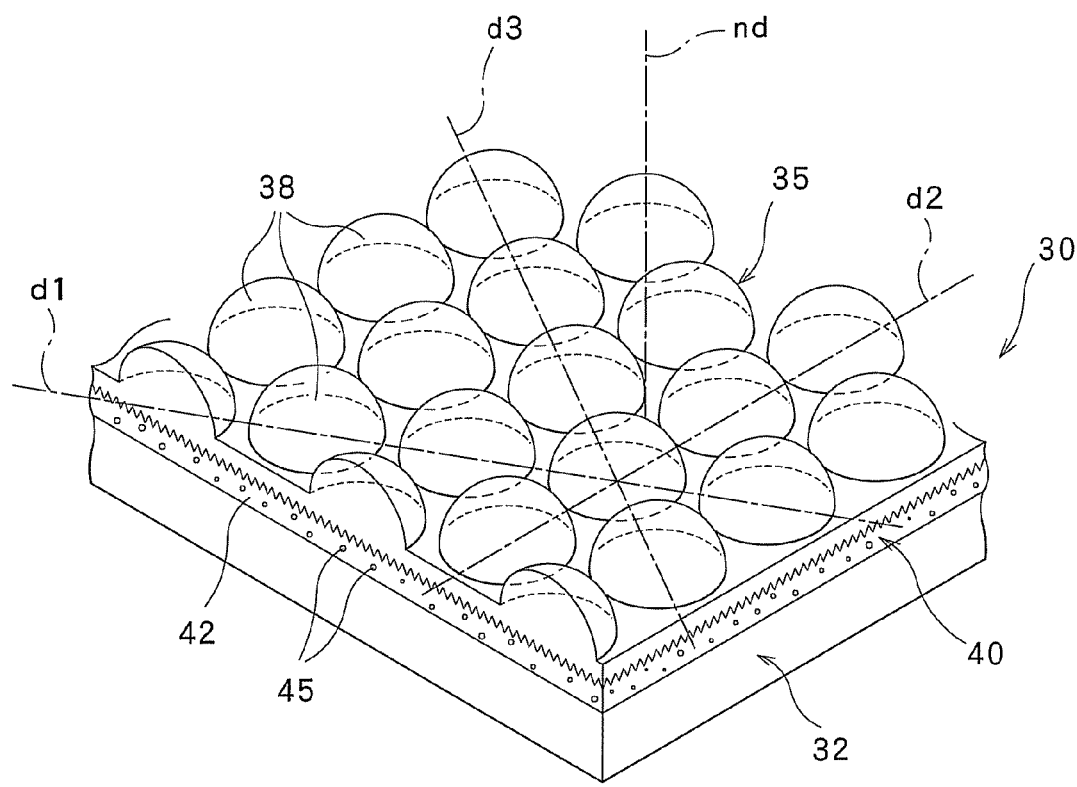
FIG. 12 is a perspective view corresponding to FIG. 2, for explaining a variation of the optical sheet.
Figure 13:
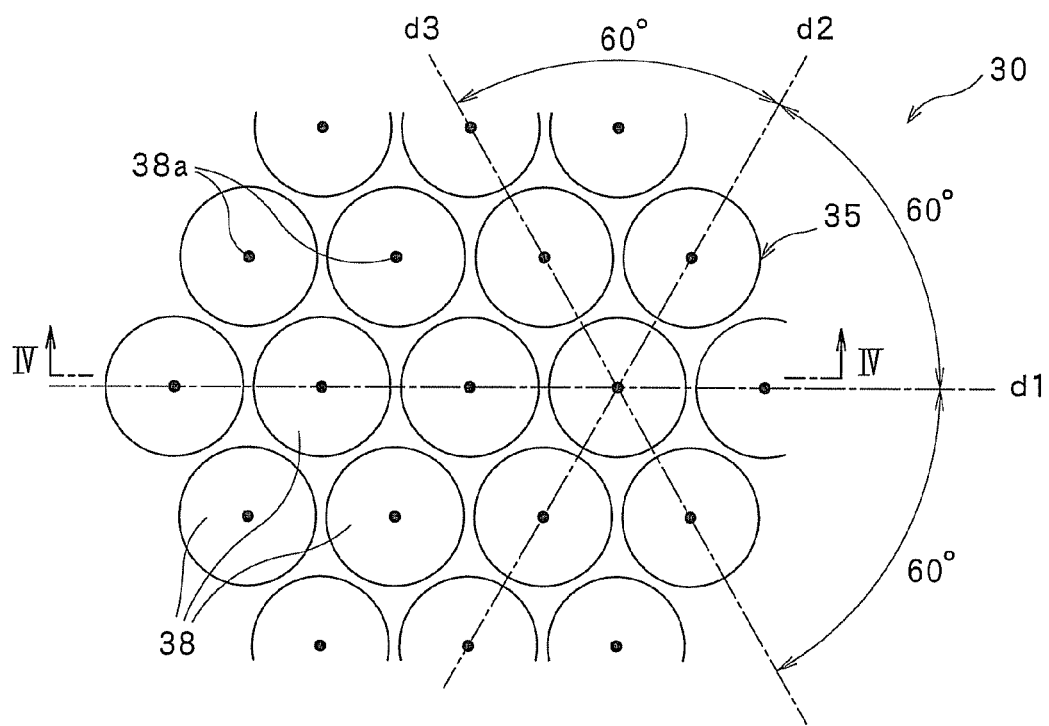
FIG. 13 is a top view of the optical sheet show in FIG. 12.

FIGS. 12 and 13 show an exemplary fly's eye lens, to which the present invention is applied, composed of unit shaped elements 38 arranged in two different directions both parallel to the sheet surface of the optical sheet. In the embodiment shown in FIG. 12, each unit shaped element 38 has a shape corresponding to part of a sphere or spheroid projecting toward the light outgoing side. When the cross-sectional shape of each unit shaped element 38 corresponds to part of an ellipse, either the long axis or the short axis of the ellipse preferably extends parallel to the normal direction (front direction) nd of the sheet surface of the optical sheet 30 from the viewpoint of intensively enhancing the front direction luminance. In the illustrated embodiment, the arrangement of the unit shaped elements 38 has a structure corresponding to closest packing of the shapes of the unit shaped elements 38 as projected onto the sheet surface of the optical sheet 30, i.e. congruent circles corresponding to the bottoms of the unit shaped elements 38, or a structure in which the circles are slightly spaced apart from the closest packing of the circles. Such arrangement of the unit shaped elements 38 correspond to the hexagonal closest packing structure of a crystal or a structure in which the unit shaped elements 38 are slightly spaced apart from the hexagonal closest packing structure. In other words, the unit shaped elements 38 are arranged in three different directions d1, d2, d3 on the sheet surface of the optical sheet 30 at a common pitch. The first direction d1, the second direction d2 and the third direction d3 are inclined at an angle of 60° with respect to each other on the sheet surface of the optical sheet 30. Further in other words, the unit shaped elements 38 are arranged such that the centers 38a of three adjacent unit shaped elements 38 lie at the apexes of an equilateral triangle.

Various modifications may be made to the exemplary fly's eye lens shown in FIGS. 12 and 13 which has been described by way of sample. For example, a fly's eye lens may be composed of unit shaped elements 38 squarely arranged, i.e. arranged at regular intervals in two orthogonal directions on the sheet surface of the optical sheet 30. Alternatively, a fly's eye lens may be composed of unit shaped elements 38 arranged at irregular intervals in two different directions on the sheet surface of the optical sheet 30, or arranged randomly on the sheet surface of the optical sheet 30.

Though in the above-described embodiment all the unit shaped elements 38 of the optical sheet 30 have the same construction, the present invention is also applicable to an optical sheet 30 containing unit shaped elements of a plurality of types having different shapes.

Though in the above-described embodiment the optical sheet 30 is comprised of the three layers: the base layer 32, the light diffusing layer 40 and the light control layer 35, the layer structure may be arbitrarily modified. For example, an optical sheet 30 may be comprised of four or more layers. Such an optical sheet may include, for example, an antistatic layer to prevent electrostatic adhesion of dust to the optical sheet 30. On the other hand, it is also possible to impart an antistatic function e.g. to the light diffusing layer 40 or the base layer 32 without providing an independent antistatic layer. The optical sheet 30 may include an antireflective layer constituting the outermost light incident side surface of the optical sheet 30. The provision of the antireflective layer can increase the light use efficiency. The antireflective layer may be a single layer (low-refractive index layer) having a lower refractive index than that of a layer adjacent, from the light outgoing side, to the antireflective layer (e.g. base layer 32). Alternatively, the antireflective layer may have a multi-layer structure comprising a layer (low-refractive index layer) having a low refractive index and a layer (high-refractive index layer) having a relatively higher refractive index than that of the low-refractive index layer, disposed alternately, with the low-refractive index layer being disposed on the outermost light incident side. The antireflective layer may also be a moss eye-type layer having a large number of protrusions, arranged at a pitch of not more than a light wavelength, whose cross-sectional area gradually decreases toward the light incident side, as disclosed in Japanese Patent Laid-Open Publication No. 50-70040.

Though the exemplary method for the production of the optical sheet 30 has been described, the optical sheet 30 can be produced by any other method.

Though the exemplary materials for the respective layers 32, 40, 35 of the optical sheet 30 have been described, it is possible to use any other appropriate material.

Though in the above-described embodiment the light emitter of the light source 22 of the surface light source device is comprised of a linear cold-cathode tube such as a fluorescent lamp, it is also possible to use other light emitters, such as point-like LEDs (light emitting diodes), a planar EL (electroluminescence) light emitter, etc. for the light source 22. Though in the above-described embodiment the optical sheet 30 is applied in the edge light-type (side light-type) surface light source device 20, the optical sheet 30 may be applied e.g. in a direct-type surface light source device or an EL-type light source device. When used in such a surface light source device, the optical sheet 30 can produce similar effects to those produced by the optical sheet when it is applied in the edge light-type surface light source device 20.

Though in the above-described embodiment the light control layer 35 of the optical sheet 30 is disposed on the outermost light outgoing side of the surface light source device 20 and the unit shaped elements 38 of the light control layer 35 project toward the light outgoing side, this is not limiting of the present invention. For example, in the optical sheet 30 disposed on the outermost light outgoing side of the surface light source device 20, the light control layer 35 may be disposed on the light source side (light incident side), i.e. disposed to be opposed to the surface light source. As with the above-described embodiment, such variation can also effectively prevent problems due to contact between the optical sheet 30 and another member (e.g. a light guide plate of an edge light-type surface light source device) disposed adjacent to the optical sheet 30.

Though in the above-described embodiment the surface light source device 20 is comprised of the light source 22, the reflective plate 24, the light diffusing sheet 28 and the optical sheet 30, the present invention is not limited to such a surface light source device. For example, in order to impart various light emitting properties to the surface light source device, it is possible to additionally use various members which can exert various optical effects on image light or environmental light. For instance, a polarization separation film may be disposed on the outermost light outgoing side of the surface light source device so as to enhance the front direction luminance. An exemplary polarization separation film is DBEF (registered trademark) manufacture by Sumitomo 3M Ltd.

In the above-described embodiment, the source light source device 20 incorporates only one optical sheet 30 having the linearly extending unit shaped elements 38 arranged parallel to each other. As described above, the light condensing effect of the optical sheet 30 is exerted mainly on light component traveling in a plane parallel to the arrangement direction of the unit shaped elements. It is therefore possible to incorporate into the surface light source device 20 two optical sheets 30a1, 30a2 superimposed on each other such that the arrangement directions of their unit shaped elements 38 intersect each other. For example, the arrangement directions of the unit shaped elements 38 of the two optical sheets 30a1, 30a2 intersect at a right angle in the embodiments shown in FIG. 14 or 15. In the variations shown in FIGS. 14 and 15, the surface light source device 20 is designed as a direct type. The light source 22, disposed in a position facing the light diffusing sheet 28, includes a plurality of linearly extending luminous tubes (e.g. cold-cathode tubes) 22a arranged parallel to each other. In the embodiments shown in FIGS. 14 and 15, the constructions (shape, dimensions, material, etc.) of the two optical sheets 30a1, 30a2 may either be the same or different from each other.

Figure 14:
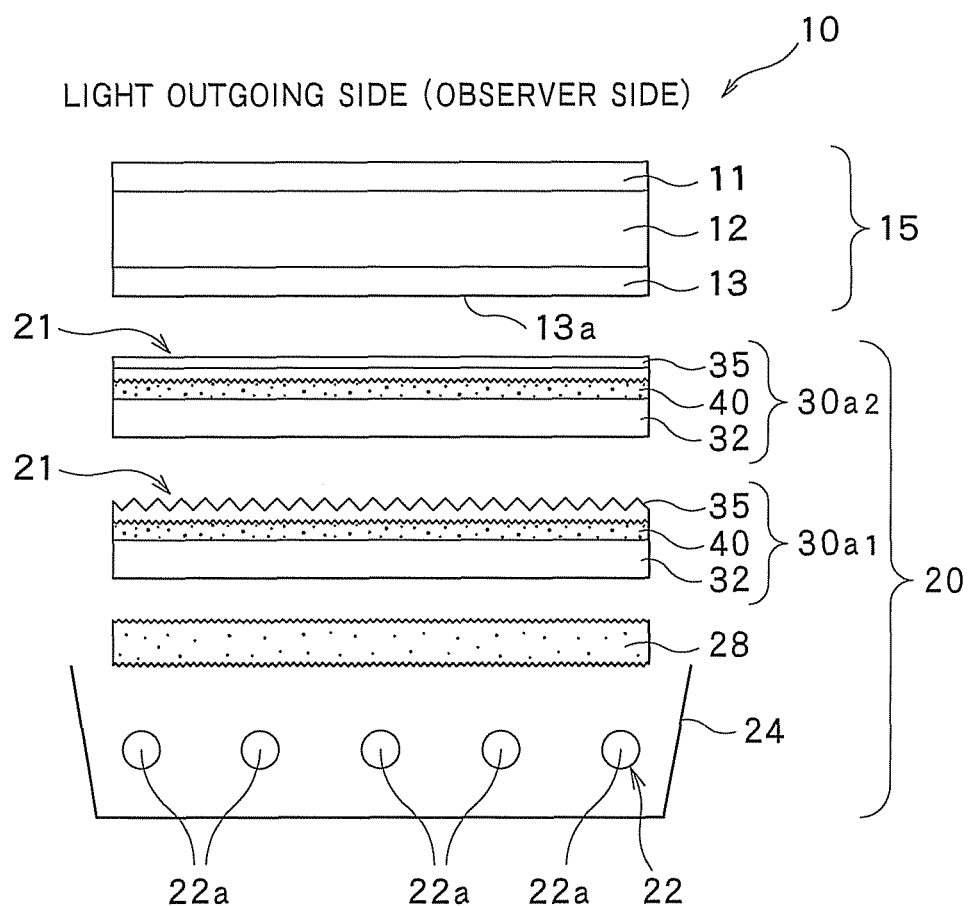
FIG. 14 is a cross-sectional view corresponding to FIG. 1, showing the schematic construction of a variation of the transmission type display device and the surface light source device.

In the embodiment shown in FIG. 14, the optical sheet 30a1, disposed on the light incident side, is disposed such that the arrangement direction of the unit shaped elements 38 intersects the longitudinal direction of the luminous tubes (light emitting bodies) 22a of the light source 22. Further, in the embodiment shown in FIG. 14, the optical sheet 30a1, disposed on the light incident side, is disposed such that the arrangement direction of the unit shaped elements 38 is parallel to the arrangement direction of the luminous tubes 22a of the light source 22, while the optical sheet 30a2, disposed on the light outgoing side, is disposed such that the arrangement direction of the unit shaped elements 38 is perpendicular to the arrangement direction of the luminous tubes 22a of the light source 22. On the other hand, in the embodiment shown in FIG. 15, the optical sheet 30a2, disposed on the light outgoing side, is disposed such that the arrangement direction of the unit shaped elements 38 intersects the longitudinal direction of the luminous tubes 22a of the light source 22. Further, in the embodiment shown in FIG. 15, the optical sheet 30a2, disposed on the light outgoing side, is disposed such that the arrangement direction of the unit shaped elements 38 is parallel to the arrangement direction of the luminous tubes 22a of the light source 22, while the optical sheet 30a1, disposed on the light incident side, is disposed such that the arrangement direction of the unit shaped elements 38 is perpendicular to the arrangement direction of the luminous tubes 22a of the light source 22.

Figure 15:
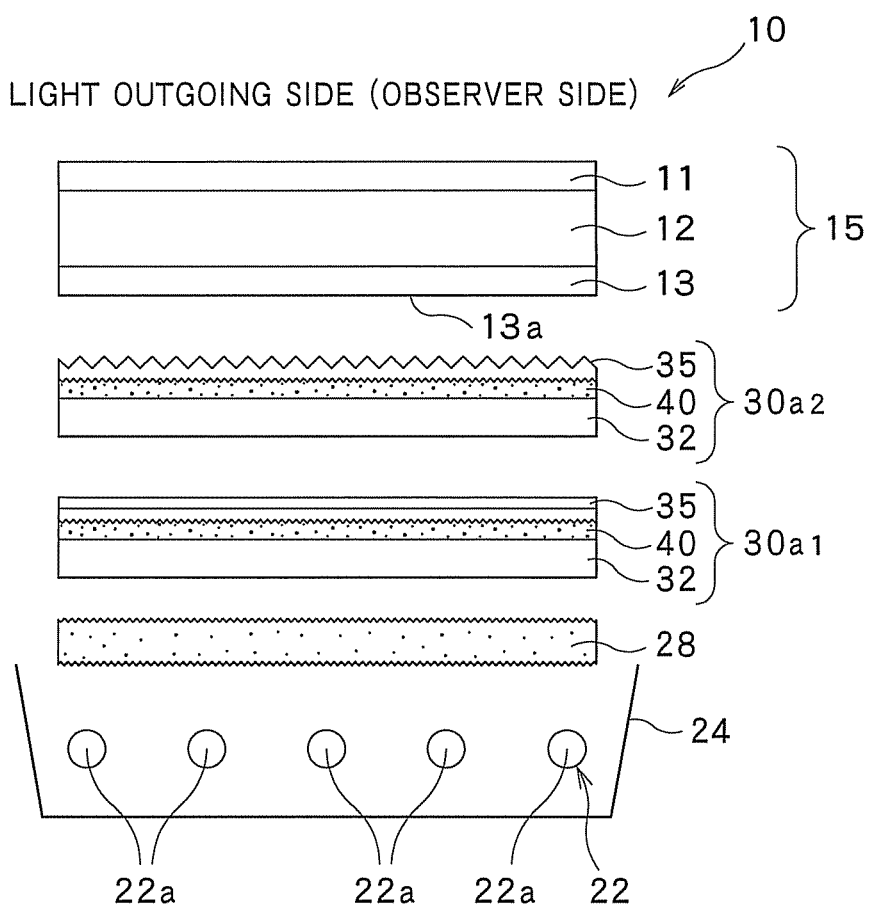
FIG. 15 is a cross-sectional view corresponding to FIG. 14, showing the schematic construction of another variation of the transmission type display device and the surface light source device.

As a result of measurement of the angular distribution of luminance, carried out by the present inventors for surface light source devices having various constructions, it has been found that according to the embodiments shown in FIGS. 14 and 15, a wide viewing angle can be secured while maintaining the front direction luminance as compared to a surface light source device in which two optical sheets without the light diffusing layer 40 (the other construction is the same as the optical sheet of the present invention, shown in FIG. 2) are used. According to the embodiments shown in FIGS. 14 and 15, even when compared to a surface light source device in which, together with the two optical sheets without the light diffusing layer 40, a polarization separation film is also incorporated, a comparable or even wider viewing angle can be secured while reducing the lowering of the front direction luminance to a visually indiscernible extent. The embodiments shown in FIGS. 14 and 15 can thus eliminate a polarization separation film from the conventional surface light source device while maintaining the optical properties, making it possible to provide a thinner device at a lower cost.

With reference to a surface light source device in which the two optical sheets without the light diffusing layer 40 are disposed in the manner shown in FIG. 14 or 15, the viewing angle tends to vary depending on the relationship between the arrangement directions of the unit shaped elements of the optical sheets and the arrangement direction of the luminous tubes 22a. Such direction dependency increases constraint on the design of the surface light source device, making the optimized design difficult. On the other hand, according to the embodiments of FIGS. 14 and 15 in which the two optical sheets of the present invention are used, the direction dependency of luminance, dependency on the arrangement directions of the unit shaped elements 38 of the optical sheets 30a1, 30a2 and on the arrangement direction of the luminous tubes 22a, can be significantly lowered as compared to the case where the two optical sheets without the light diffusing layer 40 are used. Thus, the embodiments shown in FIGS. 14 and 15 can increase the freedom of design in the incorporation of the two optical sheets 30a1, 30a2 into the surface light source device 20: the arrangement directions of the unit shaped elements of the optical sheets may be determined to optimize other required properties, such as front direction luminance, reduction of a moire pattern cause by interference with display pixels, etc. This makes it possible to adequately deal with the moire problem while allowing the two optical sheets 30a1, 30a2 to effectively perform a light condensing function as the original function of the optical sheets.

The above-described modifications, of course, may also be made in an appropriate combination to the above-described embodiments.

EXAMPLES

The following examples further illustrate the present invention, but are not intended to be limiting thereof.

<1: Inspection of Pattern>

In experiment 1, various optical sheet samples were produced in the below-described manner. Each sample was incorporated into a display device, and the display device was inspected for a defect due to contact between the optical sheet and a member adjacent to the optical sheet.

[Samples]

Samples A1 to A15, having the same construction as that of the optical sheet of the above-described embodiment, were produced by the above-described optical sheet production method.

In the samples A1 to A15, a light control layer was formed using a UV curable resin comprising a urethane acrylate prepolymer as the main component. In the samples A1 to A15, the shape of each unit shaped element was varied within the range of shapes employed in commercially available displays (liquid crystal display devices). Specifically, the width W (see FIG. 3) of each unit shaped element was varied in the range of 25 to 75 μm, the height H (see FIG. 3) of each unit shaped element was varied in the range of 12.5 to 37.5 μm, and the apex angle θ (see FIG. 3) of each unit shaped element was varied in the range of 85 to 110°.

In the samples A1 to A15, a colorless and transparent biaxially-oriented film of polyethylene terephthalate having a thickness of 100 μm was used as a base layer. The light incident side surface of each sample was made a smooth surface.

In the samples A1 to A15, the method for producing the light diffusing layer was modified for each sample. Specifically, the volume ratio between the resin of the binder resin portion and the light diffusing particles was varied. The drying conditions and the curing conditions in the production of the binder resin portion were varied. Furthermore, the coating amount of the resin of the binder resin portion was varied.

For the samples A1 to A15, the haze value of the whole optical sheet was measured in accordance with JIS K7105. Further, for the samples A1 to A15, the internal diffusion value and the internal transmittance of the light diffusing layer in the optical sheet were measured. The measurement results are shown in Table 1. The internal diffusion value and the internal transmittance of each sample were determined by producing the above-described measuring sample B (see FIG. 6), and measuring the haze value and the image definition of the measuring sample B in accordance with JIS K7105.

Further, samples B1 to B7 having the same construction as the construction shown in FIG. 16 were produced. The construction of the unit shaped elements of each of the samples B1 to B7 was made identical to the construction of the unit shaped elements of the sample of the samples A1 to A7, the numeral portion of whose sample number is the same. In each of the samples B1 to B7, the light incident side surface of the base layer was made a rough surface. The roughness of the rough surface was varied for each sample.

[Evaluation Method and Evaluation Results]

A liquid crystal display device as shown in FIG. 1 was produced. Each of the samples A1 to A15 and the samples B1 to B7 was used as the optical sheet of the display device. Components (equipment) which had been incorporated in a commercially available display (liquid crystal display device) were used as the components, other than the optical sheet, of the test display device.

(Evaluation 1)

External light was projected at varying projection angles onto the liquid crystal display device on which an image is being displayed to examine whether or not a fringe like pattern (interference pattern) is visible. The inspection results in the case where the samples A1 to A8 were used are shown in Table 1 and FIGS. 17 and 18. In Table 1 and FIGS. 17 and 18, the symbol "X" indicates that a clear fringe like pattern was found by visual observation when external light was projected at some projection angle, the symbol "O O" indicates that no fringe like pattern was found by visual observation at any projection angle of external light, and the symbol "O" indicates that a fringe like pattern was found by careful observation at some projection angle of external light, but the fringe like pattern was not such as to be a problem for the display device during its normal use.

Figure 17:
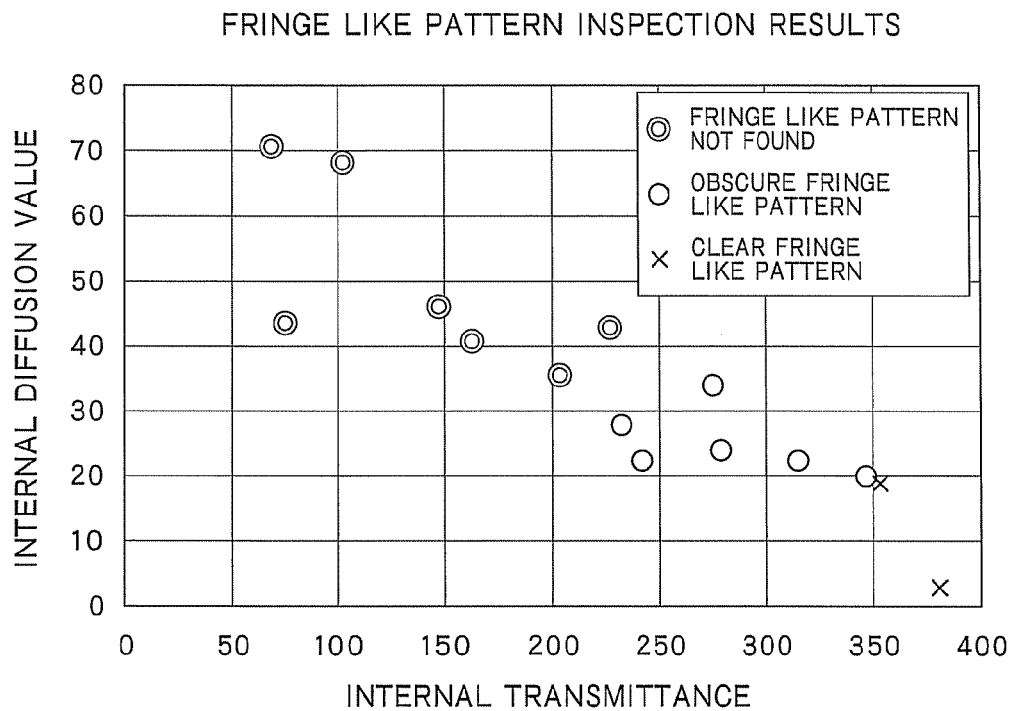
FIG. 17 is a graph showing the relationship between the presence/absence of a fringe like pattern and internal diffusion value and the relationship between the presence/absence of a fringe like pattern and internal transmittance.

As shown in Table 1 and FIG. 17, a clear fringe like pattern was not observed when a sample having an internal diffusion value of not less than 20 was used. When a sample having an internal diffusion value of not less than 35 was used, no fringe like pattern was found despite careful observation. Similarly, a clear fringe like pattern was not observed when a sample having an internal transmittance of not more than 350 was used. When a sample having an internal diffusion value of not more than 230 was used, no fringe like pattern was found despite careful observation.

Figure 18:
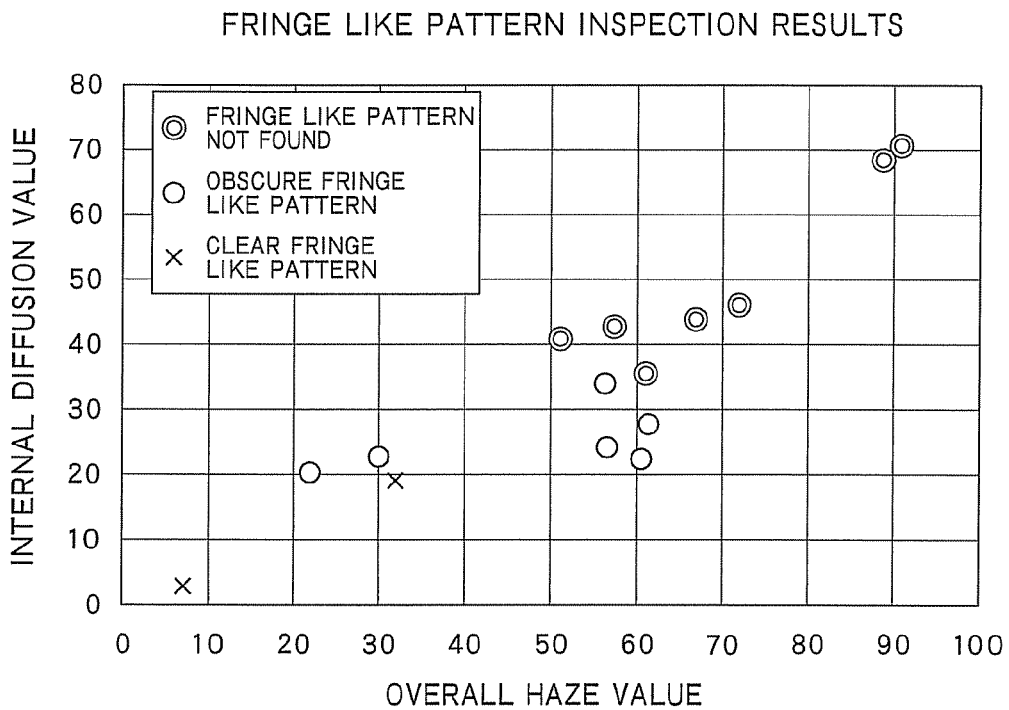
FIG. 18 is a graph showing the relationship between the overall haze value of an optical sheet and the internal diffusion value and the relationship between the overall haze value of the optical sheet and the presence/absence of a fringe like pattern.

It will be understood from FIG. 18 that when there is no correlation between the haze value of the whole sample (optical sheet) and the internal diffusion value of the light diffusing layer in the sample (optical sheet), there is also no correlation between the haze value of the whole sample (optical sheet) and the presence/absence of a fringe like pattern.

On the other hand, when each of the samples B1 to B7 was used, a clear fringe like pattern was observed when external light was projected at some projection angle.

(Evaluation 2)

The liquid crystal display device on which an image is being displayed was observed from the front to examine whether the image is visible with adequate brightness. The brightness inspection results are shown in Table 1. In Table 1, the symbol X indicates that the image brightness was inadequate compared to the image brightness obtained when using the samples B1 to B7 having no light diffusing layer, and the symbol O indicates that the image brightness was comparable or higher compared to the image brightness obtained when using the samples B1 to B7 having no light diffusing layer and was at such a level as to be deemed sufficient in general use of the display device.

TABLE 1

| Sample | Overall haze | Internal diffusion value | Internal transmittance | Fringe like pattern | Brightness |
|---|---|---|---|---|---|
| A1 | 51.2 | 40.8 | 162.9 | ○○ | ○ |
| A2 | 57.6 | 42.9 | 227.6 | ○○ | ○ |
| A3 | 66.9 | 44.0 | 74.9 | ○○ | ○ |
| A4 | 88.8 | 68.3 | 101.7 | ○○ | ○ |
| A5 | 61.0 | 35.6 | 202.6 | ○○ | ○ |
| A6 | 90.9 | 70.5 | 68.5 | ○○ | X |
| A7 | 72.0 | 46.2 | 148.0 | ○○ | ○ |
| A8 | 60.5 | 22.5 | 241.5 | ○ | ○ |
| A9 | 61.5 | 27.8 | 232.0 | ○ | ○ |
| A10 | 56.5 | 24.2 | 278.9 | ○ | ○ |
| A11 | 56.3 | 34.0 | 273.9 | ○ | ○ |
| A12 | 30.0 | 22.8 | 315.0 | ○ | ○ |
| A13 | 22.0 | 20.3 | 347.2 | ○ | ○ |
| A14 | 7.0 | 2.9 | 380.1 | X | ○ |
| A15 | 32.0 | 19.2 | 353.0 | X | ○ |

<2: Evaluation of Cracking>

In experiment 2, optical sheet samples 1 to 8 were produced in the below-described manner, and each sample was subjected to a heat endurance test.

[Samples]

Optical sheets according to the above-described embodiment were produced as the samples 1 to 8. The optical sheets have the same construction except that the material of the binder resin portion of the light diffusing layer and the material of the light control layer vary among the samples. The optical sheets were produced in the following manners.

Each unit shaped element of the light control layer was designed to have a substantially triangular shape in the main cross-section of the optical sheet. The triangular cross-sectional shape was substantially an isosceles triangle which was symmetrical with respect to an axis parallel to the normal direction of the optical sheet and whose apex angle was 90°. The height of the triangle was 25 μm. In the arrangement direction of the unit prisms, which was parallel to the sheet surface of the optical sheet, the arrangement pitch of the unit prisms was 50 μm.

The optical sheet samples 1 to 8 were produced by the following method:

A 125-μm thick PET substrate was used as a base layer. A thermosetting resin material which is to make a binder resin portion was coated, together with light diffusing particles, onto the PET substrate. Thereafter, the thermosetting resin material on the PET substrate was heated in a 120° C. drying zone for 30 seconds to remove solvents from the thermosetting resin material, thereby setting a light diffusing layer, consisting of the light diffusing particles and the binder resin portion, on the base layer. Acrylic resin particles having an average particle size of 5 μm, manufactured by Soken Chemical & Engineering Co., Ltd., were uses as the light diffusing particles. The thickness of the binder resin portion after drying was controlled at 7 μm. The surface of the binder resin portion on the side opposite to the base layer (i.e. light outgoing side surface) was a rough surface. Next, a UV curable resin material was coated onto the light diffusing layer. Thereafter, the UV curable resin material was irradiated with UV light to cure the resin material, thereby setting a light control layer.

As the UV curable resin material which is to make the light control layer and the thermosetting resin material which is to make the light diffusing layer were used the below-described resin materials a1, a2 and b1 to b6 in the combinations shown in Table 2 below to produce the optical sheet samples 1 to 8. Table 3 below shows the glass transition temperatures and the hydroxyl values of the main materials of the thermosetting resin materials b1 to b6 used for the optical sheets.

| (Resin material a1 (UV curable resin material)) | |
|---|---|
| Acrylic resin (product name HLS-138, The Inctec Inc.) | 100 parts by weight |

| (Resin material a2 (UV curable resin material)) | |
|---|---|
| Acrylic resin (product name RHID-613, The Inctec Inc.) | 100 parts by weight |

| (Resin material b1 (thermosetting resin material)) | |
|---|---|
| Polyester urethane resin (product name UR-4800, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

| (Resin material b2 (thermosetting resin material)) | |
|---|---|
| Polyester resin (product name VYLON 885, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

| (Resin material b3 (thermosetting resin material)) | |
|---|---|
| Polyester resin (product name VYLON 200, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

| (Resin material b4 (thermosetting resin material)) | |
|---|---|
| Polyester resin (product name VYLON GK880, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

| (Resin material b5 (thermosetting resin material)) | |
|---|---|
| Polyester resin (product name VYLON 226, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

| (Resin material b6 (thermosetting resin material)) | |
|---|---|
| Polyester resin (product name VYLON 630, Toyobo Co., Ltd.) | 60 parts by weight |
| Acrylic resin particles (average particle size 5 μm, Soken Chemical & Engineering Co., Ltd.) | 35 parts by weight |
| Isocyanate compound (curing agent) (product name XEL curing agent, The Inctec Inc.) | 5 parts by weight |

TABLE 2

Inspection of crack

| | | Sample | | | | | | | |
|---|---|---|---|---|---|---|---|---|---|
| | | 1 | 2 | 3 | 4 | 5 | 6 | 7 | 8 |
| Light control portion | | a1 | a1 | a1 | a2 | a2 | a2 | a2 | a2 |
| Binder resin portion | | b1 | b2 | b3 | b2 | b4 | b5 | b3 | b6 |
| Crack | Condition 1 | abs. | abs. | pres. | abs. | abs. | pres. | pres. | pres. |
| | Condition 2 | abs. | abs. | pres. | abs. | abs. | abs. | pres. | pres. |
| | Condition 3 | abs. | abs. | abs. | abs. | abs. | abs. | pres. | pres. |
| | Condition 4 | abs. | abs. | abs. | abs. | abs. | abs. | abs. | pres. |
| Difference in glass transition temperature (° C.) | | 12 | 15 | 27 | 13 | 7 | 27 | 25 | 85 |
| Elongation at 80° C. (%) | Light control portion | 1 | 1 | 1 | 2 | 2 | 2 | 2 | 2 |
| | Binder resin portion | 2 | 4 | 17 | 4 | 4 | 17 | 18 | 20 |

TABLE 3

Main thermosetting resin material

| Resin material | Main material | Glass transition temp. ° C. | Hydroxyl value KOHmg/g | Linear expansion coefficient |
|---|---|---|---|---|
| b1 | UR-4800(polyester urethane resin) | 106 | 4-6 | 4.70E−04 |
| b2 | VYLON 885(polyester resin) | 79 | 16 | 2.13E−03 |
| b3 | VYLON 200(polyester resin) | 67 | 6 | 7.36E−03 |
| b4 | VYLON GK880(polyester resin) | 85 | 5 | 1.92E−03 |
| b5 | VYLON 226(polyester resin) | 65 | 20 | 7.21E−03 |
| b6 | VYLON 630(polyester resin) | 7 | 5 | 8.45E−03 |

(Remarks)
The glass transition temperature of the light diffusing layer is:
Resin material a1 (HLS-138): 118(° C.)
Resin material a2 (RHID-613): 92(° C.)

[Evaluation Method and Evaluation Results]

A heat endurance test of the optical sheets thus obtained was conducted by holding the optical sheets in an atmosphere heated at 80° C. for 1000 hours. Thereafter, the optical sheets were visually inspected for the presence of a crack. The crack inspection results are shown in Table 2. During the period from the end of curing of the light diffusing layer until the start of the heat endurance test, each optical sheet was held under the following four conditions: condition 1 under which the optical sheet was subjected to the heat endurance test immediately after curing of the light diffusing layer; condition 2 under which after curing of the light diffusing layer, the optical sheet was held in a 30° C. atmosphere for one day before it was subjected to the heat endurance test; condition 3 under which after curing of the light diffusing layer, the optical sheet was held in a 30° C. atmosphere for three days before it was subjected to the heat endurance test; and condition 4 under which after curing of the light diffusing layer, the optical sheet was kept in 30° C. atmosphere for seven days before it was subjected to the heat endurance test.

Measurement of glass transition temperature Tg was carried out for the resin materials a1 and a2 which each are to make the light control layer of the optical sheet and for the resin materials b1 to b6 which each are to make the binder resin portion of the light diffusing layer of the optical sheet. For each sample, the difference in glass transition temperature between the resin material which is to make the light control layer and the resin material which is to make the binder resin portion was determined, the results of which are shown in Table 2. The measurement of glass transition temperature was carried out in accordance with the DSC method using a differential scanning calorimeter (Shimadzu DSC-50).

Using the resin materials a1 and a2 which each are to make the light control layer of the optical sheet and the resin materials b1 to b6 (not containing light diffusing particles) which each are to make the binder resin portion of the light diffusing layer of the optical sheet, strip-shaped test specimens having a constant cross-sectional shape were produced. The percentage elongation E of each of the resin materials a1, a2, b1 to b6 was determined using the test specimens. The percentage elongation E is equal to a value obtained by multiplying the linear expansion coefficient by the temperature difference before and after heating. That is to say, the percentage elongation (%) is the ratio (percentage) of "the difference ΔL between the length LS of the measurement region of a test specimen at a predetermined temperature before heating and the length LE of the measurement region of the test specimen at a predetermined temperature after heating" relative to "the length LS of the measurement region of the test specimen at the predetermined temperature before heating". Thus, the percentage elongation E is represented by the following formula:

$$E(\%) = (LE - LS)/LS \times 100$$

Figure 19:
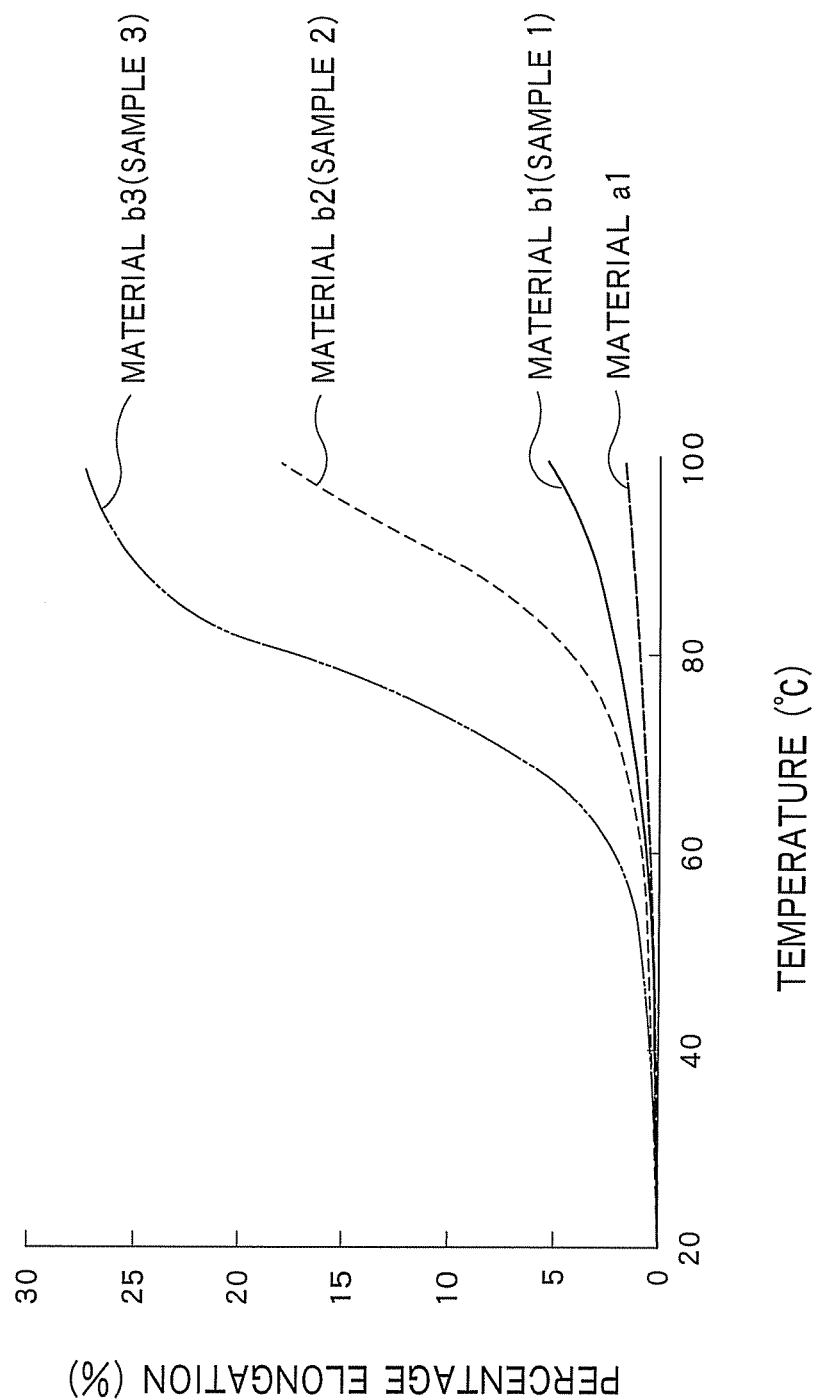
FIG. 19 is a graph showing some examples of the results of measurement of percentage elongation.
Figure 20:
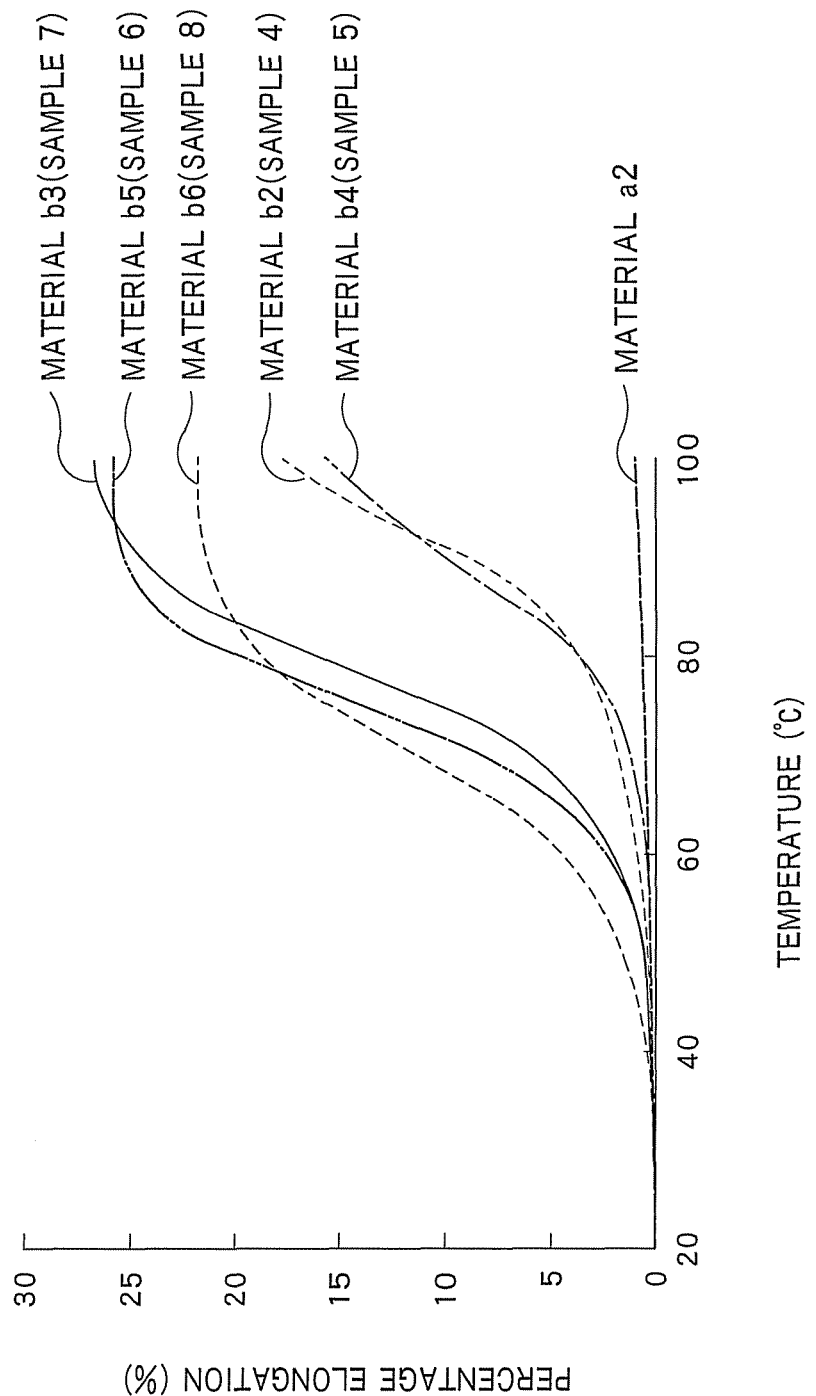
FIG. 20 is a graph showing some other examples of the results of measurement of percentage elongation.

The temperature of each test specimen was set at 20° C., and the temperature of the test specimen was raised to 100° C. The temperature rise rate (heating rate) in an atmosphere in which the test specimen was placed was set at 5° C./min. The measurement region of the test specimen had a width of about 5 mm, a length of about 10 mm and a thickness of about 150 μm. The results of measurement of the percentage elongation E (%) at the heating temperature of 80° C. are shown in Table 2. FIGS. 19 and 20 show change of the elongation E (%) with the heating temperature. FIG. 19 shows the results of measurement of the percentage elongation E for the resin materials a1, b1 to b3 for the optical sheet samples 1 to 3, and FIG. 20 shows the results of measurement of the percentage elongation E for the resin materials a2, b2 to b6 for the optical sheet samples 4 to 8.

<3: Evaluation of Luminance Characteristics>

In experiment 3, surface light source devices were produced in the below-described manner, and luminance characteristics were evaluated for each surface light source device.

[Samples]

Example A1

An optical sheet having the same construction as the optical sheet according to above-described embodiment was produced. In particular, a colorless and transparent biaxially-oriented film of polyethylene terephthalate having a thickness of 100 μm was used as a base layer. A thermosetting resin, containing light diffusing particles dispersed therein, was applied onto the base layer to form a light diffusing layer. The light diffusing particles had an average particle size of 5 μm. UR 4800 was used as the thermosetting resin which is to make the binder resin portion. Thereafter, a UV curable resin, comprising a urethane acrylate prepolymer as the main component, was applied onto the light diffusing layer and cured to set a light control layer.

Each unit shaped element of the light control layer was designed to have a substantially triangular shape in the main cross-section of the optical sheet. The triangular cross-sectional shape was substantially an isosceles triangle which was symmetrical with respect to an axis parallel to the normal direction of the optical sheet and whose apex angle was 90°. The height of the triangle was 25 μm. In the arrangement direction of the unit prisms, which was parallel to the sheet surface of the optical sheet, the arrangement pitch of the unit prisms was 50 μm.

The internal diffusion value and the internal transmittance of the light diffusing layer in the optical sheet were measured. The internal diffusion value was 45% and the internal transmittance was 88%. The internal diffusion value and the internal transmittance were determined by producing the above-described measuring sample B (see FIG. 6), and measuring the haze value and the image definition of the measuring sample B in accordance with JIS K7105.

Using two such optical sheets according to the present invention, a surface light source device, having the same construction as that of the surface light source device shown in FIG. 14, was produced. Thus, in the surface light source device of Example A1, the arrangement direction of the unit shaped elements of the light incident side optical sheet was made parallel to the arrangement direction of the luminous tubes of the light source and perpendicular to the arrangement direction of the unit shaped elements of the light outgoing side optical sheet. Components (equipment) which had been incorporated in a commercially available display (liquid crystal display device) were used as the components, other than the optical sheets, of the surface light source device of Example A1.

Example A2

The surface light source device of Example A2 was designed to have the same construction as that of the surface light source device of Example A1, except that a polarization separation sheet (DBEF), manufactured by Sumitomo 3M Ltd., was provided on the light outgoing side of the light outgoing side optical sheet.

Example B1

A surface light source device, having the same construction as that of the surface light source device shown in FIG. 15, was produced with the use of the same components as the components of the surface light source device of Example A1. Thus, in the surface light source device of Example B1, the arrangement direction of the unit shaped elements of the light incident side optical sheet was made perpendicular to the arrangement direction of the luminous tubes of the light source and perpendicular to the arrangement direction of the unit shaped elements of the light outgoing side optical sheet. The surface light source device of Example B1 was designed to have the same construction as the surface light source device of Example A1 except for the difference in the angle of the arrangement direction of the unit shaped elements of each of the light incident side and light outgoing side optical sheets with respect to the arrangement direction of the luminous tubes of the light source.

Example B2

The surface light source device of Example B2 was designed to have the same construction as that of the surface light source device of Example B1, except that a polarization separation sheet (DBEF), manufactured by Sumitomo 3M Ltd., was provided on the light outgoing side of the light outgoing side optical sheet.

Comparative Example A1

An optical sheet, which differs from the optical sheet incorporated into the surface light source device of Example A1 only in that the light diffusing layer is omitted, was produced. Thus, the optical sheet of Comparative Example A1 was produced in the following manner: A colorless and transparent biaxially-oriented film of polyethylene terephthalate having a thickness of 100 μm was used as a base layer. A UV curable resin, comprising a urethane acrylate prepolymer as the main component, was applied directly onto the light diffusing layer and cured to set a light control layer on the base layer. The light control layer of the resulting optical sheet was made to have the same shape and the same dimensions as those of the light control layer of the optical sheet incorporated into the surface light source device of Example A1.

Using two such comparative optical sheets, a surface light source device, having the same construction as that of the surface light source device shown in FIG. 14, was produced. Thus, in the surface light source device of Comparative Example A1, the arrangement direction of the unit shaped elements of the light incident side optical sheet was made parallel to the arrangement direction of the luminous tubes of the light source and perpendicular to the arrangement direction of the unit shaped elements of the light outgoing side optical sheet. Components (equipment) which had been incorporated in a commercially available display (liquid crystal display device) were used as the components, other than the optical sheets, of the surface light source device of Comparative Example A1. The surface light source device of Comparative Example A1 thus differs from the surface light source device of Example A1 only in that the optical sheets of the former device have no light diffusing layer.

Comparative Example A2

The surface light source device of Comparative Example A2 was designed to have the same construction as that of the surface light source device of Comparative Example A1, except that a polarization separation sheet (DBEF), manufactured by Sumitomo 3M Ltd., was provided on the light outgoing side of the light outgoing side optical sheet. The surface light source device of Comparative Example A2 thus differs from the surface light source device of Example A2 only in that the optical sheets of the former device have no light diffusing layer.

Comparative Example B1

A surface light source device, having the same construction as that of the surface light source device shown in FIG. 15, was produced with the use of the same components as the components of the surface light source device of Comparative Example A1. Thus, in the surface light source device of Comparative Example B1, the arrangement direction of the unit shaped elements of the light incident side optical sheet was made perpendicular to the arrangement direction of the luminous tubes of the light source and perpendicular to the arrangement direction of the unit shaped elements of the light outgoing side optical sheet. The surface light source device of Comparative Example B1 was designed to have the same construction as the surface light source device of Comparative Example A1 except for the difference in the angle of the arrangement direction of the unit shaped elements of each of the light incident side and light outgoing side optical sheets with respect to the arrangement direction of the luminous tubes of the light source. The surface light source device of Comparative Example B1 thus differs from the surface light source device of Example B1 only in that the optical sheets of the former device have no light diffusing layer.

Comparative Example B2

The surface light source device of Comparative Example B2 was designed to have the same construction as the surface light source device of Comparative Example B1, except that a polarization separation sheet (DBEF), manufactured by Sumitomo 3M Ltd., was provided on the light outgoing side of the light outgoing side optical sheet. The surface light source device of Comparative Example B2 thus differs from the surface light source device of Example 82 only in that the optical sheets of the former device have no light diffusing layer.

[Evaluation Method and Evaluation Results]

Figure 22:
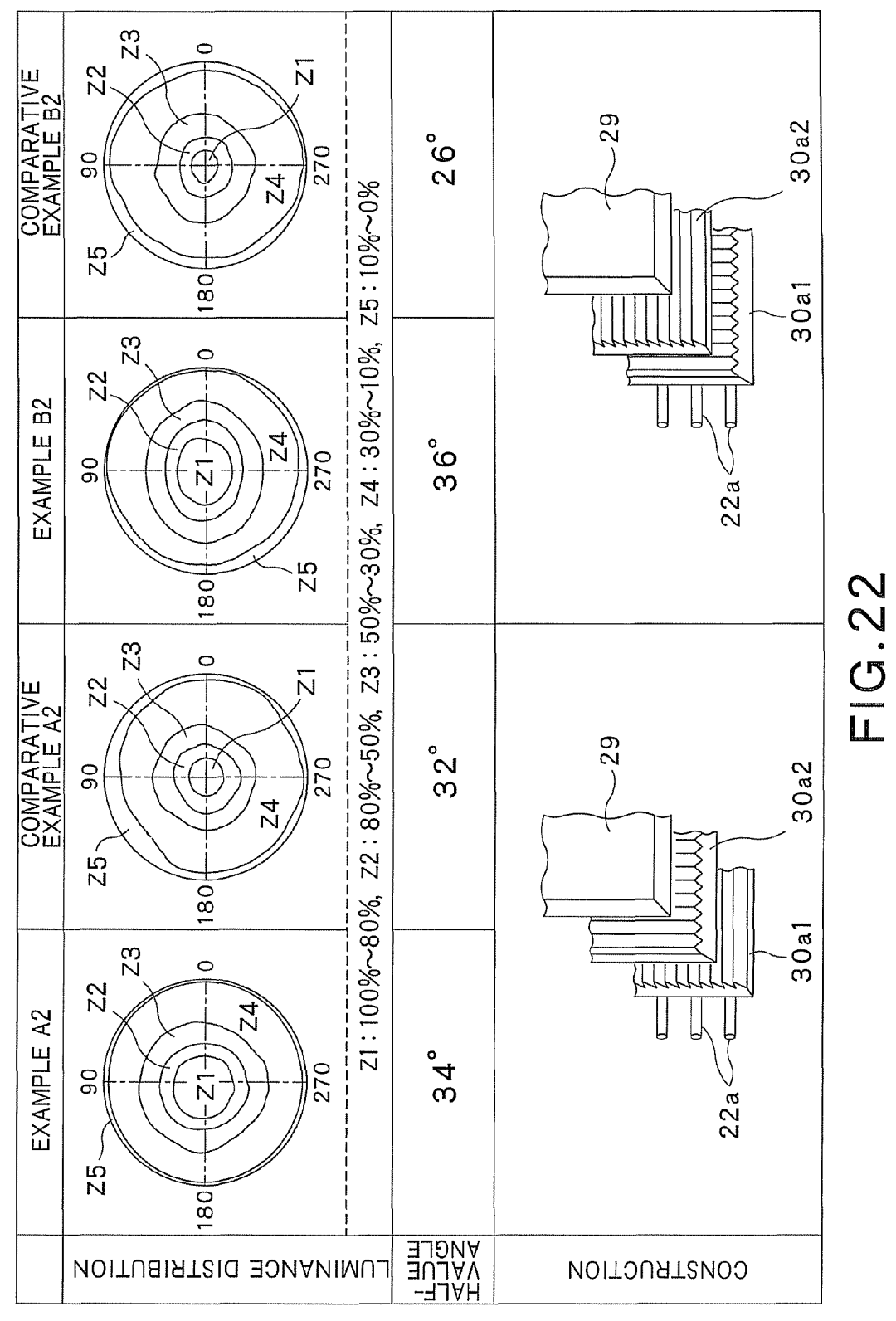

The luminance of each surface light source device was measured in various directions using a luminance meter (Minolta BM-7). The measurement results are shown in FIGS. 21 and 22. In the circular graphs shown in the row under the heading "luminance distribution" in FIGS. 21 and 22, the angular distribution of luminance in various directions is shown in terms of the percentage luminance relative to the front direction luminance of each surface light source device. For example, the luminance distribution in the direction connecting "0" and "180" in each circular graph indicates the angular distribution of luminance measured in various measurement directions in a horizontal plane (plane parallel both to the longitudinal direction of the luminous tubes and to the normal direction of the display surface). Similarly, the luminance distribution in the direction connecting "90" and "270" in each circular graph indicates the angular distribution of luminance measured in various measurement directions in a vertical plane (plane parallel both to the arrangement direction of the luminous tubes and to the normal direction of the display surface). The center of each circular graph indicates the luminance measured in the front direction; and the measurement angle (angle of the luminance measurement direction with respect to the front direction) for the luminance value (percentage luminance relative to the front direction luminance) at a point inside the circle increases as the point moves radially away from the center of the circle.

In FIGS. 21 and 22, the "half-value angle" refers to a measurement angle (horizontal half-value angle) in a horizontal plane at which the measured luminance value is half the front direction luminance.

In FIGS. 21 and 22, in the row under the heading "construction" are schematically shown the arrangement direction of the luminous tubes 22a of the light source, the arrangement direction of the unit shaped elements of the optical sheet 30a1 disposed on the light incident side, the arrangement direction of the unit shaped elements of the optical sheet 30a2 disposed on the light outgoing side, and the presence/absence of the polarization separation film 29.

As can be seen from comparison between Example A1 and Comparative Example A1 and between Example B1 and Comparative Example B1 in FIGS. 21 and 22, the surface light source devices of the Examples can provide a smoother angular distribution of luminance. In contrast, a second luminance peak appears at a large measurement angle with respect to the front direction in the angular distribution of each of Comparative Examples A1 and B1.

With reference to Comparative Examples A1 and B1, there is a large difference between the angular distribution of luminance in a horizontal plane and the angular distribution of luminance in a vertical plane. Further, the pattern of the contour lines, representing the levels of luminance, of Comparative Example A1, when it is rotated by 90 degrees, resembles the pattern of the contour lines of Comparative Example B1. That is to say, the horizontal angular distribution of luminance of Comparative Example A1 resembles the vertical angular distribution of luminance of Comparative Example B1, and the vertical angular distribution of luminance of Comparative Example A1 resembles the horizontal angular distribution of luminance of Comparative Example B1.

With reference to Example A1, on the other hand, the horizontal angular distribution of luminance generally resembles the vertical angular distribution of luminance. Similarly, with reference to Example B1, the horizontal angular distribution of luminance generally resembles the vertical angular distribution of luminance. That is to say, the luminance data demonstrates that the surface light source devices of Examples A1 and B1 can sufficiently reduce the direction dependency of luminance without using a polarization separation film.

Furthermore, the half-value angle measured for each of the surface light source devices of the Examples is larger than the half-value angle measured for the surface light source device of the corresponding Comparative Example. This indicates that the surface light source devices of the Examples can secure a wider viewing angle.

As can be seen in the data of FIG. 22, the use of a polarization separation film can increase the half-value angle of the surface light source device. However, even when compared to the surface light source devices of Comparative Examples A2 and B2 which both use a polarization separation film, the surface light source devices of Examples A1 and B1, which have no polarization separation film, have a comparable or higher half-value angle.

The invention claimed is:

1. An optical sheet comprising:
   a sheet-like base layer;
   a light control layer having unit shaped elements arranged in an arrangement direction parallel to a sheet surface of the base layer, each unit shaped element extending linearly in a direction intersecting the arrangement direction of the unit shaped elements; and
   a light diffusing layer disposed between the base layer and the light control layer,
   wherein the light control layer further includes a sheet-like support layer adjacent to the light diffusing layer, and the unit shaped elements are disposed on a surface, on a side opposite to the light diffusing layer, of the sheet-like support layer,
   wherein a surface, on a side of the light control layer, of the light diffusing layer is a rough surface having raised portions, and the raised portions are disposed at finer pitch than the unit shaped elements;
   wherein the light diffusing layer has a binder resin portion and particles dispersed in the binder resin portion, and
   wherein the particles contained in the binder resin portion include an aggregate of aggregated single particles.

2. The optical sheet according to claim 1, wherein an internal diffusion value of the light diffusing layer, which indicates a degree of light diffusion by the light diffusing layer in the optical sheet and which is expressed in terms of a haze value, is not less than 20.

3. The optical sheet according to claim 1, wherein an internal transmittance of the light diffusing layer, which indicates a degree of a proportion of light transmitted through the light diffusing layer in the optical sheet and which is expressed in terms of a sum of image definition values measured by using a 0.125-mm optical comb, a 0.5-mm optical comb, a 1.0-mm optical comb and a 2.0-mm optical comb, is not less than 70.

4. The optical sheet according to claim 1,
   wherein the light diffusing layer is disposed between the base layer and the light control layer such that the light diffusing layer is adjacent both to the base layer and to the light control layer, and
   wherein the light control layer is disposed on an outermost light outgoing side.

5. The optical sheet according to claim 1,
wherein a refractive index of the binder resin portion of the light diffusing layer differs from a refractive index of a layer adjacent, from a side of the light control layer, to the light diffusing layer; and
wherein an average value of radii of curvature at tops of the raised portions differs from an average value of radii of granulated substances, the granulated substances being formed of the aggregate or the single particles and existing in the light diffusing layer.

6. The optical sheet according to claim 5,
wherein the average value of radii of curvature at tops of the raised portions is lower than the average value of radii of the granulated substances in the light diffusing layer.

7. The optical sheet according to claim 5,
wherein the average value of radii of curvature at tops of the raised portions is higher than the average value of radii of the granulated substances in the light diffusing layer.

8. The optical sheet according to claim 1, wherein a ratio of a linear expansion coefficient of a material of the binder resin portion of the light diffusing layer, as measured when heating the material from 20° C. to 80° C., relative to a linear expansion coefficient of a material of the light control layer, as measured when heating the material from 20° C. to 80° C., is not more than 1500%.

9. The optical sheet according to claim 1, wherein a difference in glass transition temperature between a material of the light control layer and a material of the binder resin portion of the light diffusing layer is not more than 30° C.

10. A surface light source device comprising:
a light source; and
the optical sheet according to claim 1 which receives light from the light source.

11. The surface light source device according to claim 10, wherein the optical sheet is disposed such that a surface formed by the unit shaped elements of the light control layer constitutes a light emitting surface.

12. A surface light source device comprising:
a light source including luminous tubes;
a light incident side optical sheet, which is the optical sheet according to claim 1, disposed in a position facing the light source; and
a light outgoing side optical sheet, which is the optical sheet according to claim 1, disposed on a light outgoing side of the light incident side optical sheet,
wherein the unit shaped elements of the light control layer of the light incident side optical sheet extend linearly in a direction intersecting an arrangement direction thereof,
wherein the unit shaped elements of the light control layer of the light outgoing side optical sheet extend linearly in a direction intersecting an arrangement direction thereof, and
wherein the arrangement direction of the unit shaped elements of the light incident side optical sheet intersects the arrangement direction of the unit shaped elements of the light outgoing side optical sheet.

13. The surface light source device according to claim 12,
wherein the arrangement direction of the unit shaped elements of the light incident side optical sheet is perpendicular to an arrangement direction of the luminous tubes, and
wherein the arrangement direction of the unit shaped elements of the light outgoing side optical sheet is perpendicular to the arrangement direction of the unit shaped elements of the light incident side optical sheet.

14. A transmission type display device comprising:
a transmission type display unit; and
the surface light source device according to claim 10, disposed to be opposed to the transmission type display unit.

15. The transmission type display device according to claim 14,
wherein the transmission type display unit has a smooth surface as a light incident side surface facing the surface light source device, and
wherein the optical sheet of the surface light source device is disposed such that the unit shaped elements of the light control layer are in contact with the smooth surface of the transmission type display unit.

16. A transmission type display device comprising:
a transmission type display unit; and
the surface light source device according to claim 12, disposed to be opposed to the transmission type display unit.

17. The transmission type display device according to claim 16,
wherein the transmission type display unit has a smooth surface as a light incident side surface facing the surface light source device, and
wherein the optical sheet of the surface light source device is disposed such that the unit shaped elements of the light control layer are in contact with the smooth surface of the transmission type display unit.

* * * * *